United States Patent [19]

Fedor et al.

[11] 4,119,701

[45] * Oct. 10, 1978

[54] NO$_x$ REDUCTION CATALYST FOR INTERNAL COMBUSTION ENGINE EMISSION CONTROL

[75] Inventors: Robert J. Fedor, Westlake; Cameron S. Ogden, Hudson, both of Ohio

[73] Assignee: Gould Inc., Rolling Meadows, Ill.

[*] Notice: The portion of the term of this patent subsequent to Jul. 13, 1993, has been disclaimed.

[21] Appl. No.: 704,019

[22] Filed: Jul. 9, 1976

Related U.S. Application Data

[60] Division of Ser. No. 524,771, Nov. 18, 1974, Pat. No. 4,006,105, which is a continuation-in-part of Ser. No. 441,504, Feb. 11, 1974, abandoned, Ser. No. 451,032, Mar. 22, 1974, abandoned, Ser. No. 453,567, Mar. 22, 1974, abandoned, Ser. No. 457,101, Apr. 1, 1974, abandoned, Ser. No. 460,742, Apr. 15, 1974, abandoned, Ser. No. 460,786, Apr. 15, 1974, abandoned, Ser. No. 460,787, Apr. 15, 1974, abandoned, Ser. No. 461,436, Apr. 15, 1974, abandoned, Ser. No. 466,737, May 3, 1974, abandoned, Ser. No. 466,965, May 6, 1974, abandoned, and Ser. No. 467,106, May 6, 1974, abandoned, which is a continuation-in-part of Ser. No. 207,338, Dec. 13, 1971, abandoned, Ser. No. 207,284, Dec. 13, 1971, abandoned, Ser. No. 207,337, Dec. 13, 1971, abandoned, Ser. No. 207,303, Dec. 13, 1971, abandoned, Ser. No. 240,028, Mar. 31, 1972, abandoned, Ser. No. 240,029, Mar. 31, 1972, abandoned, Ser. No. 240,091, Mar. 31, 1972, abandoned, Ser. No. 240,090, Mar. 31, 1972, abandoned, Ser. No. 240,092, Mar. 31, 1972, abandoned, Ser. No. 207,281, Dec. 13, 1971, abandoned, Ser. No. 207,525, Dec. 13, 1971, abandoned, which is a continuation-in-part of Ser. No. 149,331, Jun. 2, 1971, abandoned.

[51] Int. Cl.$^2$ .............................................. B01D 53/34
[52] U.S. Cl. .............................. 423/213.2; 423/213.5; 252/477 R
[58] Field of Search ............... 423/213.2, 213.5, 213.7; 23/288; 60/301; 252/477

[56] References Cited

U.S. PATENT DOCUMENTS

| | | | |
|---|---|---|---|
| 2,526,657 | 10/1950 | Guyer | 252/477 |
| 3,546,075 | 12/1970 | Sheetz et al. | 29/191 |
| 3,773,894 | 11/1973 | Bernstein et al. | 423/213.5 |
| 3,969,480 | 7/1976 | Fedor et al. | 423/213.5 |

FOREIGN PATENT DOCUMENTS

1,132,899  3/1964  Fed. Rep. of Germany.

OTHER PUBLICATIONS

"Chemical Abstracts" vol. 69, 1963 p. 13, 258.

*Primary Examiner*—G. O. Peters
*Attorney, Agent, or Firm*—R. E. Baumann; E. E. Sachs

[57] ABSTRACT

A process for reducing the oxides of nitrogen in exhaust gases from an internal combustion engine comprising contacting the exhaust gases with a self supporting catalytic structure in the form of an expanded thin metal foil. The expanded metal foil comprises a corrosion resistant metallic substrate having an NO$_x$ reducing catalyst on the surface layer. The corrosion resistance substrate may be a nickel/chromium alloy, and the NO$_x$ catalytic surface may be a nickel/copper alloy.

28 Claims, 19 Drawing Figures

NO_x REDUCTION CATALYST FOR INTERNAL COMBUSTION ENGINE EMISSION CONTROL

CROSS REFERENCE TO RELATED APPLICATIONS

This application is a division of Ser. No. 524,771 filed Nov. 18, 1974, now U.S. Pat. No. 4,006,105 which is a continuation-in-part of Ser. No. 441,504, Feb. 11, 1974, Ser. No. 451,032, Mar. 22, 1974, Ser. No. 453,567, Mar. 22, 1974, Ser. No. 457,101, Apr. 1, 1974, Ser. No. 460,742, Apr. 15, 1974, Ser. No. 460,786, Apr. 15, 1974, Ser. No. 460,787, Apr. 15, 1974, Ser. No. 461,436, Apr. 15, 1974, Ser. No. 466,737, May 3, 1974, Ser. No. 466,965, May 6, 1974, and Ser. No. 467,106, May 6, 1974, all abandoned, which in turn are a continuation-in-part of Ser. No. 207,338, Dec. 13, 1971 Ser. No. 207,284, Dec. 13, 1971, Ser. No. 207,337, Dec. 13, 1971, Ser. No. 207,303, Dec. 13, 1971, Ser. No. 240,028, Mar. 31, 1972, Ser. No. 240,029, Mar. 31, 1972, Ser. No. 240,091, Mar. 31, 1972, Ser. No. 240,090, Mar. 31, 1972, Ser. No. 240,092, Mar. 31, 1972, Ser. No. 207,281, Dec. 13, 1971, Ser. No. 207,525, Dec. 13, 1971, all abandoned, which in turn are a continuation-in-part of Ser. No. 149,331, June 2, 1971, abandoned.

The entire disclosure of each of the foregoing patent applications is hereby expressly incorporated in this application by reference.

BACKGROUND OF THE INVENTION

The subject invention is directed to the art of emission control devices and, more particularly, to a system and an improved article, the metallurgical composition and structure of which are particularly suited for reducing the oxides of nitrogen, especially nitric oxide and nitrogen dioxide (herein collectively referred to as $NO_x$), which are commonly found in the exhaust gases emanating from an internal combustion engine.

More particularly, the invention concerns a system for the removal of significant amounts of $NO_x$ from the exhaust gases of the internal combustion engine which includes the use of a catalytic structure which can be mounted in the exhaust system of an internal combustion engine and which is characterized by its corrosion resistance and its efficacy in reducing the various oxides of nitrogen ($NO_x$) at temperatures of about 1100° F. and above.

The invention further relates to a system of operating an internal combustion engine and includes the use of a catalytic structure capable of reducing oxides of nitrogen, from the exhaust gases of an internal combustion engine. In addition, it concerns a catalytic structure comprising a durable, corrosion resistant metal substrate having an effective amount of a $NO_x$ reducing catalyst metallurgically bonded thereto.

This invention also relates to a method of manufacturing a corrosion resistant catalytic structure which is capable of catalytically reducing oxides of nitrogen found in the exhaust gases of an internal combustion engine. In particular, the invention concerns a method of manufacturing a thin, low mass, high surface area expanded metal structure which is capable of catalytically reducing $NO_x$ comprising a durable, corrosion resistant nickel, cobalt or iron base substrate or support having an effective amount of an $NO_x$ reducing catalyst adherently deposited on at least part of the surface of the substrate or support.

DESCRIPTION OF THE PRIOR ART

Many undesirable gases are found in the exhaust stream emanating from an internal combustion engine. Some of the most harmful and annoying of these gases are carbon monoxide, unburned hydrocarbons and the various oxides of nitrogen.

Presently, much effort is being directed toward the removal of carbon monoxide and unburned hydrocarbons by thermal or catalytic oxidation and to the diminution or elimination of the oxides of nitrogen by catalytically induced reduction. Specifically, with regard to the various oxides of nitrogen, the present desire is to eliminate at least 90% of the $NO_x$ found in the exhaust gases issuing from the typical internal combustion engine, using the 1971 U.S.A. automotive vehicle as the base.

Many references can be found in the prior art which concern certain catalysts and catalyst assemblies that are, at least theoretically, capable of reducing $NO_x$ to less harmful substances. However, such prior art is devoid of any reference or teaching which concerns an economical and durable $NO_x$ reducing catalyst or catalyst assembly which is especially well-suited for use in the operating enviroment associated with the exhaust stream issuing from today's automobiles or a method of manufacturing such a catalyst. Moreover, the prior art does not contain any reference or teaching which discloses how the various catalysts can be incorporated in a device so that their efficacy is sustained for a useful time period.

As typical of the prior art, tests have been published indicating that nickel-copper alloys are very active catalytic $NO_x$ reduction devices. In use, these catalytic devices are formed into Berl saddles to increase the surface area and to provide for a relatively low pressure catalyst containing assembly. However, in actual operation, experience has indicated that nickel-copper alloys have an oxidation limit of about 1300° F., or slightly higher, whereas present day internal combustion engines have an efflux temperature, during some part of the normal operating cycle, of up to about 1900° F. Such high temperatures cause a rapid deterioration of the catalyst and substantially reduce its effective life span. Furthermore at high temperatues, the structures of prior art devices, such as Berl saddles, are caused to be sintered together to a point where eventually significant gas blockage occurs. Thus, while copper-nickel alloys are sufficiently active in reducing up to 90% of the $NO_x$ present, they are impractical at this time due to a lack of durability.

An extensive analysis of the various known $NO_x$ reducing catalytic devices and the problems pertaining to their use is found in an article published by the Society of Automotive Engineers on Jan. 11, 1971, entitled "$NO_x$ Reducing Catalyst for Vehicle Emission Control" (Paper No. 710291). This publication discloses both supported and unsupported catalysts and catalytic systems and contains an extensive discussion of the problems associated with the use of such devices. The SAE article also includes the disclosure of a composite of copper and stainless steel in the form of wire mesh screen of stainless steel plated with copper.

In addition, U.S. Pat. No. 3,565,547, issued Feb. 23, 1971, entitled "Catalytic Conversion of Exhaust Gas Impurities," contains an informative and relatively detailed description of unsupported $NO_x$ reducing catalysts, particularly those formed into Berl saddles, and discusses the problems experienced in the use thereof.

Still other approaches are discussed and described in British Pat. No. 1,058,706, entitled "Catalytic Structures for Improvement in or Related to Treatment of Gases," published Feb. 15, 1967. This patent discusses various methods of forming such catalytic structures and the problems experienced in connection with their ultimate use. In the main, it concerns a method of rendering a given catalyst suitable for use in a lead containing atmosphere and discloses a ceramic substrate on which is coated a $NO_x$ reducing material. Thus it is representative of a catalyst in which the activating, or $NO_x$ reducing material, does not withstand high temperatures by itself but must be supported by a suitable substrate.

In the main, the deficiencies of prior catalysts are due to the fact that the present stringent $NO_x$ reduction requirements necessitate the operation of the catalyst in a corrosive atmosphere at unusually high temperatures. For example, under normal operating conditions in a conventional internal combustion engine, such a catalyst is often exposed to temperatures ranging from about 1100° F. to 1700° F., and higher. Under these operating conditions, it has heretofore been essentially impossible to find a $NO_x$ reducing catalyst which evidences the requisite catalytic efficiency and also possesses the necessary structural durability.

It is also presently believed that, at least in part, the deficiencies of prior art systems are due to the composition and the structural characteristics of these metallurgical systems, including the geometric configuration thereof.

Another major disadvantage of prior catalyst structures has been a low surface area to mass ratio. As a consequence, the time required to bring the structures up to operating temperature is comparatively long. Throughout this warm-up period emission of unreduced oxides of nitrogen takes place. Moreover, generally speaking, for a given mass of structure, the greater the area of catalytically active surface presented to the exhaust stream, the more efficient the reduction process. Consequently, structures which embody a low surface area to mass ratio will not perform as effectively as would be the case should the ratio be increased. Attempts to increase the gross surface area of the structure usually result in a larger catalytic mass which has the effect of increasing the warm-up period, with consequent reduction in catalyst efficiency. Further, the introduction of increased mass into the exhaust stream produces an undesirable obstruction to the flow of gases through the system, thus generating build-up in the back pressure which adversely affects the operation of the engine.

In general, it may be summarized that presently known catalyst structures have failed to provide the required degree of $NO_x$ reduction due to a lack of structural rigidity at high temperatures, insufficient corrosion resistance, back-pressure build up due to agglomeration, spalling of the catalytically active surface, or a combination of any or all of these shortcomings, and that while the prior art is replete with references concerning emission control devices it has failed to disclose or even suggest a $NO_x$ reducing catalyst composition or structure which exhibits the desired degree of catalytic efficiency together with adequate catalyst durability, or a method of economically producing such a catalyst.

The instant invention overcomes the hereinbefore set forth types of problems associated with prior art devices by providing a system for operating an internal combustion engine which includes the use of a durable, efficient $NO_x$ reducing catalytic structure comprising a corrosion resistant substrate having an effective amount of a suitable $NO_x$ reduction catalyst metallurgically bonded thereto.

The subject invention overcomes the above-discussed problems associated with prior devices and provides an efficient, durable $NO_x$ reducing catalytic structure capable of operating for extended periods of time with a high degree of efficacy and low back-pressure build up. Structures formed in accordance with the invention can provide a high surface area to mass ratio.

SUMMARY OF THE INVENTION

According to one aspect of the invention, a system for reducing $NO_x$ gases found in the exhaust stream of the internal combustion engine is provided which includes an internal combustion engine having associated therewith a means for supplying fuel and oxygen to the engine, a manifold system for directing or channeling the exhaust gases from the engine, and a $NO_x$ reducing catalyst assembly communicating with the manifold which includes a housing having a $NO_x$ reducing catalytic structure of apertured thin metal foil positioned therein which comprises a durable, chromium containing corrosion resistant nickel, cobalt or iron base substrate having on at least one surface, an effective amount of a $NO_x$ reducing catalyst selected from the group consisting of iron, nickel, cobalt, copper, manganese and mixtures thereof, with the catalytic structure having been produced according to the method described herein.

According to another aspect, the present invention is accomplished by providing a $NO_x$ reducing catalytic structure comprising a durable, corrosion resistant nickel, cobalt or iron base support or substrate having an effective amount of a $NO_x$ reducing catalyst metallurgically bonded thereto.

According to another aspect, the invention contemplates an article for reducing the oxides of nitrogen in exhaust gases from an internal combustion engine of an automotive vehicle and comprises a catalytic structure adapted to be placed in a housing through which the exhaust gases flow. The structure is sized so that a major portion of the gases passing through the housing must pass through the structure. The structure includes an apertured, thin metal foil of a material effective catalytically to reduce $NO_x$.

Preferably, and in accordance with a more limited aspect of the invention, the foil has a surface area to mass ratio in the range of approximately 2 to 16 square inches per gram. This area is determined by linear dimension only, which is to say that the measurement excludes the additional surface area defined by peaks and valleys obtained through surface treatment. This additional surface area can be obtained, if desired, through the use of conventional techniques for roughening the surface of the foil. As is apparent, ratios of this magnitude promote rapid heat-up, increased efficiency and minimization of back-pressure build up.

It is also contemplated that the foil will preferably be expanded to provide an open mesh structural configuration, and will be tightly wound in a plural layer helical coil. Additionally the portions of material between the openings in the expanded foil are twisted and/or inclined relative to the mean plane of the foil sheet. Thus, when assembled into a plural layer structure, an extremely tortuous circuitous path with substantial impingement and scrubbing of the gases against the catalytic surfaces of the foil is assured. Moreover, the resulting structure can have a density of in the range of only 2 to 12 percent of an equivalent solid volume of the foil material.

Various more limited aspects of the invention contemplate that the catalytic structure can be formed in several different configurations. For example, the catalytic mass can be formed by coiling the expanded metal foil tightly around a central mandrel of small diameter. Alternately, the catalytic structure can be a hollow, tightly wound coil and positioned in the housing so that the gas flows radially through the wound coil. In both of these configurations a multiplicity of relatively circuitous gas flow paths are provided.

It is also contemplated that the layers can be individual separate sheets of expanded foil merely stacked tightly in the housing. The catalytic structure irrespective of its particular form should desirably substantially completely fill the cross-section of the housing so that the majority of all gas passing through the housing must pass through the catalytic structure.

According to another aspect, the present invention concerns a method of manufacturing an efficient, supported $NO_x$ reducing catalyst which is exceptionally resistant to corrosion at high temperatures, especially at those temperatures commonly experienced in the stream of exhaust gases emanating from an internal combustion engine, which method comprises providing a sheet of thin metal foil, expanding the metal foil to thereby form a plurality of strands defining openings therebetween, depositing a metal or combination of metals on at least part of the surface of the expanded metal foil which when alloyed with the metal foil increases its resistance to corrosion, alloying the deposited metal with the metal foil, and coating at least or part of the surface of the expanded metal foil with an adherent layer of an effective amount of a catalyst material which is capable of catalytically reducing $NO_x$.

In the practice of the instant invention, the sheet of thin metal foil which constitutes the catalyst support or substrate can be fabricated in many different ways. For example, it is possible to produce the sheet of metal foil by conventional electrodeposition techniques. Likewise, the sheet of thin metal foil can be formed from a wrought material or it can be produced by powder metallurgy techniques. In actual practice, it is often preferred to form the sheet metal foil by electrodeposition as this technique is especially well suited for the production of a relatively thin material.

The expanding of the sheet of metal foil to thereby form a plurality of strands defining openings therebetween can be accomplished in a number of ways well known to the prior art.

By utilizing the teachings of the instant invention, it is possible to obtain a $NO_x$ reducing catalytic structure which is highly efficient in catalytically reducing $NO_x$ and exceptionally durable, i.e., resistant to attrition and corrosion at high temperatures.

Accordingly, a major object of the invention is to provide a system for catalytically reducing $NO_x$ found in the exhaust gases of the internal combustion engine.

A further object of the invention is the provision of an apparatus of the general type described wherein the catalytic structure comprises a self-sustaining assembly of expanded metal foil.

It is a primary object of the invention to provide a catalyst of self-supporting material which combines high $NO_x$ reducing activity with high structural stability and which is effective at elevated temperatures of the level normal to internal combustion engine exhaust systems.

It is another object of the present invention to provide a catalytic structure in which the outer surface has a relatively high activity and the interior is adapted for high structural stability with a controlled gradient of materials between the outer surface and the interior.

It is a further object of the present invention to provide a catalyst wherein the surface material and the interior are synthesized.

It is a still further object of the present invention to provide a structure in which the surface thereof is primarily composed of $NO_x$ active material and the bulk of the structure is high temperature oxidation resistant.

It is a still further object of the invention to form the catalytic structure as an expanded metal foil to prevent air blockage and to maximize surface area and heat-up rate.

Yet another object is a provision of a $NO_x$ reducing structure for the exhaust system of an automotive vehicle which is capable of prolonged operation at high temperatures without loss of efficiency or build up of back-pressure.

Another primary object of the instant invention to provide a method of manufacturing a supported $NO_x$ reducing catalytic structure which exhibits a high degree of catalytic activity and which is also especially effective when used to catalytically reduce the $NO_x$ found in the exhaust gases emanating from an internal combustion engine.

Other objects and the means of accomplishing them will be apparent to those skilled in the art from a reading of the following description and claims.

DESCRIPTION OF THE PREFERRED EMBODIMENTS

The catalytic structure of the invention is physically composed of a plurality of different zones or regions comprising a corrosion resistant substrate and a highly active $NO_x$ reducing catalyst layer metallurgically bonded to the substrate in such a manner that the chemical composition of the substrate is different than the chemical composition of the catalytic layer. Outstanding results have been achieved when the substrate is a nickel/chromium alloy and the catalyst is a mixture of nickel and copper.

The catalyst substrate is formed from a metal or alloy having particularly good corrosion resistance and high temperature strength. For example, a corrosion resistant nickel, cobalt or iron base foil has been used for the substrate and a $NO_x$ reducing catalyst selected from the group consisting of iron, nickel, cobalt, copper, manganese and mixtures thereof has been metallurgically bonded thereto. Other types of foils formed from different substrates and the reducing catalysts have been proposed.

As used herein the term "nickel, cobalt or iron base substrate" shall mean a substrate wherein the weight percent of the base metal, e.g. nickel, always exceeds the individual weight percent of any other filler material, viz., cobalt and/or iron.

Metals and alloys which are especially suitable for use in the practice of the instant invention are described in the commonly assigned U.S. patent applications, Ser. Nos. 207,284; 207,525; 207,303; 207,337 and 207,281, entitled Nickel Base $NO_x$ Reducing Catalytic Structure, Cobalt Base $NO_x$ Reducing Catalytic Structure, Chromium Containing Iron Base $NO_x$ Reducing Catalytic Structure, Self-Supporting $NO_x$ Reducing Catalyst and Aluminum Containing Iron Base $NO_x$ Reducing Catalytic Structure, respectively, all filed on Dec. 13, 1971, and incorporated herein by reference.

In the practice of the instant invention, the starting metal foil or substrate is fabricated from either a nickel, cobalt or iron base material, preferably nickel, which has chromium therein as a corrosion inhibitor. Specific compositions for use in forming the catalyst substrate are discussed in the hereinbefore referred to U.S. patent applications. The exact composition which is to be employed in fabricating a particular sheet of metal foil depends to a great degree on actual automotive exhaust environment in which the resultant catalytic structure is utilized, nevertheless we have found nickel/chromium alloys outstanding in performance when used in automobile exhaust systems.

More specifically, the catalytic structure of the instant invention comprises a chromium containing nickel, cobalt or iron base substrate, which may also optionally contain amounts of nickel, iron and/or cobalt filler metal having a $NO_x$ reducing catalyst metallurgically bonded to at least one but preferably all surfaces of the substrate. (As used herein the term "metallurgically bonded" shall mean bonded together by the formation of a localized alloy). However, it should be noted here that the nickel, cobalt or iron base substrate used in the instant invention may be devoid of any of the other two metals, if desired, or only trace amounts may be present.

In this system, chromium is an oxide former and imparts corrosion resistance to the substrate, whereas nickel, cobalt and/or iron are filler materials which impart strength and mass to the substrate. The amount of filler material in the substrate can range from about 50 to 85 weight percent, with the remainder usually being chromium. In the nickel cobalt or iron base system of the present invention, if desired, up to 40 weight percent of the other two metals can be added to its substrate composition. In such a system, the minimum base metal content is about 17 weight percent of the substrate, preferably about 48 weight percent or more. In addition, up to about 10 weight percent of aluminum can be included in the substrate composition of the invention. However, when aluminum is substituted for some of the chromium, the total weight percent of aluminum plus chromium cannot exceed about 50 weight percent.

The metal which is employed to render the metal foil substrate resistant to corrosion is preferredly chromium or a mixture of chromium and aluminum. In the preferred practice of the invention, chromium is deposited on expanded metal foil and the subsequently alloyed therewith by heating the resultant article to a temperature of about 2200° F. for a period of about 2 hours in a partial vacuum (usually at a pressure of about one-half an atmosphere of argon). Any of the various well known techniques of depositing chromium on a metal substrate may be used in the practice of the instant invention. For example, the chromium may be deposited by vapor deposition, by electrodeposition or by powder metallurgy techniques and the like. When the thin metal foil sheet is to be alloyed with aluminum also, the aluminum is preferably deposited on the sheet of metal foil and diffused therein to form the resultant alloyed structure. This method of depositing aluminum on the metal foil is not critical and various techniques such as hot dipping, electrodeposition and the like may be utilized. Essentially, it can be applied to the metal foil substrate by the same general techniques employed for applying chromium.

Foils made from commercially available corrosion resistant alloys such as "Nichrome" may also be utilized in the invention under suitable circumstances.

The invention is further explained with reference to the following process sequence for making a chromium containing nickel base substrate having a copper and/or nickel $NO_x$ catalyst metallurgically bonded thereto.

In the manufacture of the catalytic structure of the invention, a metal is alloyed with a sheet of metal foil to render it resistant to corrosion. In the preferred practice of the invention, chromium is usually employed for this purpose. Chromium can be deposited on the surface of the metal foil and in addition, aluminum can be utilized in conjunction with chromium to render the sheet of metal foil resistant to corrosion.

The starting material may be a conventional electroplated nickel foil produced continuously on a drum using a sulfamate bath. This produces commercially pure nickel which can contain some impurities including up to about 1% by weight cobalt. All other impurities are present in fairly negligible amounts. suitable, electrically conductive bath to uniformly electrodeposit thereon commercially pure chromium. When chromium is the sole oxide former, the amount of chromium deposited is so controlled that chromium will constitute about 15 or 18 to about 50 weight percent of the resultant substrate. It has been found that a substrate having an oxide former content of less than about 15 to 18 weight percent, depending on the operational characteristics of the engine in which it is to be used, do not provide enough high temperature corrosion resistance. Preferably the chromium content is around 30 weight percent. Also, data has indicated that exceeding the upper range of chromium content imparts poor formability to the resultant structure.

The chromium coating on the substrate, which is still predominantly in elemental form at this point, is alloyed or synthesized with the substrate material by a thermal diffusion process which occurs in a furnace at about 2200° F. under suitable conditions. The alloying of the deposited corrosion inhibiting metal with the sheet of metal foil could also be accomplished by various conventional techniques.

When chromium is utilized as the corrosion inhibiting metal, the resulting metallurgical make-up of the so-produced substrate can range from a completely homogeneous nickel-chromium alloy to one wherein the concentration of chromium continuously decreases as the center of the substrate is approached. In practice, the actual type of alloy obtained will depend on such parameters as starting foil thickness and time and temperature of the alloying process. Usually, a homogeneous alloy is utilized.

The catalytic structure of the instant invention comprises a nickel, cobalt or iron base substrate which supports or carries the $NO_x$ reducing catalyst. The following table shows the principal constituents of the substrate compositions which fall within the scope of the instant invention.

| Substrate Components | Element*** | Range (In Weight Percent of Substrate) |
|---|---|---|
| Filler Material | Nickel | 0 to 85 |
| Filler Material | Cobalt | 0 to 85 |
| Filler Material | Iron | 0 to 85 |
| Oxide Former | Chromium* | 5 to 50** |
| Oxide Former | Aluminum* | 0 to 10 |

*When both chromium and aluminum are present the weight percent of chromium plus aluminum cannot exceed 50.
**In an iron base substrate when no aluminum is present, the minimum chromium content is 30 weight percent.
***Small amounts of other elements such as silicon, manganese, etc. may also be present.

The foil should be less than about 0.010 inches in thickness and can be made from different metals, alloys, and combinations thereof. The commonly assigned applications mentioned earlier describe several such combinations which are particularly suitable. In any event, at least a major portion of the surface of the foil should comprise an effective amount of $NO_x$ reducing catalyst. This can be accomplished by adherently depositing a suitable $NO_x$ catalyst material on the surface of the metal foil or substrate.

Particularly good test results have been obtained with a catalytic structure fashioned from a substrate consisting essentially of about 80 weight percent nickel and about 20 weight percent chromium with the catalytic material to be metallurgically bonded thereto consisting essentially of about 80 weight percent nickel and about 20 weight percent copper. After the metallurgical bonding of the catalyst to the substrate has been effected, it is preferred that 0.5 to 5 percent chromium be present on the surface of the catalytic layer.

Recent tests have indicated that a substrate containing about 70 percent nickel and about 30 percent chromium with optional small amounts of other elements such as silicon, iron and/or manganese lends excellent durability to a $NO_x$ reducing catalytic structure formed thereon.

The above-described material constitutes the substrate to which a highly active $NO_x$ reducing material is metallurgically bonded. Catalytic materials suitable for this purpose are copper, nickel, iron, cobalt, manganese and alloys thereof. Recent test data has shown that a catalytic layer consisting of 80 weight percent nickel and 20 weight percent copper has been especially effective in reducing $NO_x$ is less harmful substances. The before mentioned catalytic materials are metallurgically bonded to the substrate in such a manner that little, if any, of the catalytic material migrates into the substrate or intermediate zone. In practice, any catalytic material which actually migrates into the substrate proper does not significantly affect the chemical and physical properties of the substrate and is not considered as part of the substrate proper. Generally, the catalyst layer constitutes from about 0.5 to about 50 weight percent of the resultant catalytic structure.

It is preferred that the catalyst layer constitute at least about 2 percent of weight of the catalytic structure. Under some circumstances the catalytic structure may comprise up to about 60 or more weight percent catalyst. However, in use all that is required is that an effective amount of catalyst be present.

In the herein described preferred embodiment of the invention, nickel and/or copper, if desired, is electroplated upon the substrate and subsequently metallurgically bonded thereto by diffusion which thereby establishes an outer catalytic zone or layer and an intermediate zone essentially defining the substrate. The diffusion treatment causes part of the chromium in the substrate to migrate toward and into the outer zone or catalytic layer. Microprobe tests have determined that varying amounts of up to about 15 weight percent chromium can be present on the surface of the catalytic layer without seriously affecting its operability as a $NO_x$ reduction catalyst at temperatures ranging from about 1100° F. to about 1700° F. The exact upper limit of the permissible chromium content in the outer zone and particularly in the surface thereof, under all circumstances is not yet known.

The main criteria for a suitable $NO_x$ reducing catalyst is that (1) it does not deleteriously react with the expanded metal foil substrate and (2) that it is effective in catalytically reducing $NO_x$ gases under the conditions of intended use.

The exact mechanism by which $NO_x$ is catalytically reduced by a catalyst of the type described herein in an environment of the type associated with the exhaust gases emanating from the typical internal combustion engine is rather complex. However, it is generally agreed that the overall reduction reaction (with respect to $NO_x$) can be written as follows:

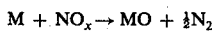

$$M + NO_x \rightarrow MO + \tfrac{1}{2}N_2$$

where M is a $NO_x$ reducing catalyst of the type herein described.

Known materials which are capable of catalytically reducing $NO_x$ and preferredly utilized in the practice of the instant invention are nickel, cobalt, iron, manganese, copper and mixtures thereof. These catalytic materials are adherently deposited or coated on the thin metal foil substrate either before or after expansion of the foil in such a manner that little, if any (but not substantially more than 10%) of the catalytic material migrates into the expanded metal foil substrate, and therefore the catalytic material appears essentially only in the outer zone. In the preferred practice of the invention, the catalyst material is electrodeposited on the thin metal foil substrate and then subsequently diffusion bonded thereto. When two or more catalyst materials are employed, it is possible to co-deposit them on the substrate in such a manner that they will adhere thereto without any diffusion bonding. However, if the materials are individually deposited on the substrate, it is preferred to alloy them together and during this procedure they become diffusion bonded to the substrate. In addition to the foregoing technique, the catalyst material can be applied to the thin metal foil substrate by such techniques as vapor deposition, flame spraying, slip casting and dry powder sintering, etc. The exact method of coating the substrate with the $NO_x$ reducing catalyst is not critical. All that is required is that the catalyst be adherently deposited on the substrate so that it does not prematurely fall off during use or handling.

The amount of catalyst material to be applied to the substrate is determined empirically and controlled, in the main, by the physical and chemical properties of the specific catalyst used and the automotive exhaust environment in which it is intended to utilize the resultant catalytic structure. In practice, catalytic structures having a coating thickness on a given surface ranging from about 0.0001 to about 0.0015 inches or more have been utilized with highly satisfactory results being obtained. On a weight basis, it has been found to be highly desirable to utilize a $NO_x$ reducing catalytic structure which consists of from about 2 weight percent to about 50 weight percent catalyst material with remainder being the supporting substrate.

The diffusion treatment causes part of the chrome to migrate toward the surface of the catalyst. With regard to the effectiveness of the $NO_x$ catalyst, it should be pointed out that when applying the catalytic material to the hereinbefore described substrate, care should be taken to avoid or minimize the migration of the corrosion inhibiting metal, which is usually chromium and, if desired, aluminum, to the surface of the $NO_x$ catalyst as such substances usually reduce catalyst efficiency. From a practical standpoint, when operating at temperatures ranging from about 1100° F. to about 1900° F., that is, at the temperatures usually experienced in the exhaust stream emanating from today's automobiles, the chromium content at the surface of the catalytic layer should preferably be less than about 15 weight percent, most preferably less than 12 weight percent. In addition, if aluminum is also included in the catalytic structure as a means for rendering the substrate foil resistant to corrosion, care should be taken to avoid having more than about 4 weight percent of aluminum present on the surface of the catalytic layer. However, it should be pointed out here that when operating an internal combustion engine at higher temperatures and/or under different air to fuel ratios, it may be possible to tolerate a higher percentage of chromium and/or aluminum on a surface of a catalytic layer and still have a efficient catalytic system. As used herein the term "surface of the catalytic layer" shall mean the volume defined by the area covered by the catalytic material taken to the depth measurable by a 20,000 volt microprobe, i.e., approximately 50 to 80 microinches in depth.

After the catalytic layer has been adherently deposited on the surface of the expanded metal substrate and, if desired, metallurgically bonded thereto, i.e., bonded thereto by the formation of a localized alloy, the catalytic layer can be differentiated from the substrate proper by the amount and distribution of the corrosion inhibiting metal (oxide formers usually chromium and, if desired, aluminum) found in these respective sections of the resultant catalytic structure. In a system wherein the only oxide former used is chromium, as before noted, the amount of chromium present in the substrate can range from about 15 to about 50 weight percent. In the resultant catalytic structure, in weight percent; there usually is less corrosion inhibitor (oxide former) present in the catalytic layer than in the substrate proper. In actual practice, there usually is a gradient of corrosion inhibitor throughout the catalytic structure ranging from a point of maximum concentration in the substrate (at least 15 weight percent chromium) to a point of relatively low concentration in the catalytic layer (for example, not greater than 15 weight percent of chromium on the surface of the catalytic layer). That is, the surface of the catalytic layer usually contains a lower weight percent of corrosion inhibitor than does the substrate proper. Stating it functionally, the substrate contains enough corrosion inhibitor to render it resistant to corrosion, whereas the catalytic layer contains none to minimum amounts of corrosion inhibitor, so as not to impair its ability to function as an $NO_x$ reducing catalyst. It should be noted here that the chemical composition of the catalyst layer is usually different than the chemical composition of the expanded metal foil or substrate.

At low oxygen concentrations in dual catalyst systems where the generation of ammonia presents problems, it has recently been discovered that the use of a catalyst composition comprising at least 90% nickel and less than 10% copper provides improved results in terms of minimizing the generation of the undesirable ammonia. A further description of this subject matter is found in copending application Ser. No. 305,738 filed Nov. 13, 1972, which is also assigned to the assignee of the present application.

In the preferred embodiment of the invention, the herein described catalytic structure is formed from an expanded metal foil which, in turn, is stamped or otherwise fashioned into a suitable configuration, such as a disc, helical coil, corrugated strip, or the like, to provide a high surface, low mass catalyst assembly.

Catalytic structures of type herein described can be formed into various shapes and configurations. In actual practice, it has been determined that a highly efficient $NO_x$ reducing catalytic assembly can be obtained by producing an $NO_x$ reducing catalytic structure in sheet form, as described in the foregoing examples, and then fashioning this catalytic structure into a compacted mass, such as a helical coil, which, in turn, is then inserted into a suitable container through which $NO_x$ containing gases can be directed.

Referring more particularly to the drawings wherein the showings are for the purpose of illustrating preferred embodiments of the invention only and not for the purpose of limiting same.

Figure 1:
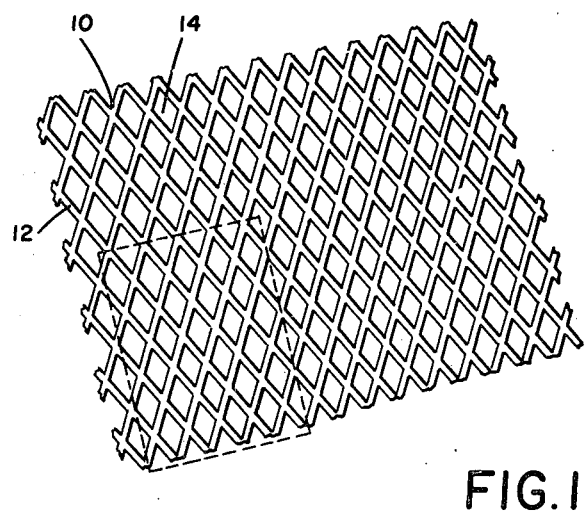
FIG. 1 is a plan view of a catalytic structure, in the form of a sheet of expanded metal foil, which was produced according to the teachings of the instant invention.
Figure 2:
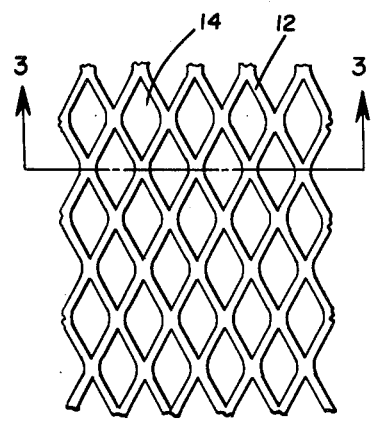
FIG. 2 is an enlarged plan view of the rectangular area shown in FIG. 1.
Figure 3:
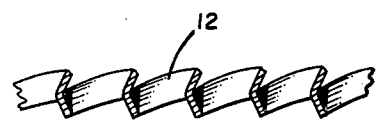
FIG. 3 is a cross-sectional view taken along line 3—3 of FIG. 2 of the catalytic structure shown in FIG. 1.

In FIGS. 1, 2 and 3 like parts are indicated by like numerals. Specifically, in FIG. 1, there is shown an expanded metal foil catalytic structure 10 comprises of a plurality of strands 12 which define openings or aperatures 14; in FIG. 2, the strands 12 and openings 14 defined thereby are shown in an enlarged manner; and in FIG. 3 a cross-sectional view of the strands 12 is shown. In addition, it can be seen from FIG. 3 that the surface of the strands 12 lie in a plane or planes which are angular with respect to the plane of the sheet of unexpanded metal foil.

FIGS. 2 and 3 show the preferred form for the foil 10. As illustrated, it comprises a multiplicity of closely spaced openings 14 separated by narrow, gas impervious portions which, in effect, form elongated strands 12. As best shown in FIGS. 2 and 3, the strand portions in intermediate rows of openings 14 are preferably inclined or twisted relative to the mean plane of the foil sheet. As can be appreciated, openings 14 are formed whereby by slitting the metal foil and expanding it by applying tension to the foil sheet in a direction generally perpendicular to the direction of the slitting. This typically produces a twist to the intermediate foil sections as shown in FIG. 3.

As will be appreciated from the drawings, the diamond shaped pattern provides for a structural relationship in which the majority of the surface extends angularly to the plane of the structure as a whole and each leg of the diamond again has an angular relationship to the adjacent legs of the same diamond as well as to the contiguous diamonds. This pattern, it is believed in conjunction with the increased surface area, appears to establish the proper environment for the gaseous material so that the metallurgical system of which the structure is composed, can suitably interact with the gases.

The catalytic structure described hereinabove is manufactured by a method comprising the steps of (1) providing a thin sheet of corrosion resistant metal foil, (2) coating at least a part of the surface of the metal foil with an adherent layer of a catalyst material which is capable of catalytically reducing the oxides of nitrogen ($NO_x$) found in the exhaust gas emanating from an internal combustion engine, and (3) expanding the sheet of metal foil to thereby form a plurality of strands defining openings therebetween. The corrosion resistant metal foil may be a wrought metal foil of a corrosion resistant alloy such as a commercially available homogenous nichrome alloy, or it may be provided by (1) providing a thin sheet of a nickel, cobalt or iron metal foil, (2) depositing an oxide forming metal on at least a part of the surface of the metal foil which when alloyed with the metal foil increases its resistance to corrosion, and (3) alloying the deposited metal with the metal foil. It is preferred to use chromium or a mixture of chromium and aluminum to increase the corrosion resistance of the nickel, cobalt or iron base foil. The step of expanding the metal foil to form a plurality of strands defining openings therebetween may be carried out either prior to the deposition of the corrosion resistance increasing metal on the nickel, cobalt or iron base foil, or after the provision of the corrosion resistant foil and prior to the application of the catalyst material thereto, or after the application of the catalyst material to the corrosion resistant metal foil. When the expansion is effected after the deposition of the catalyst material, it may be desired to carry out a subsequent heat treatment of the catalyst structure in order to cover over bare substrate metal which may have been exposed during the expansion process. Thus it is preferred to carry out the expansion of the metal foil substrate prior to application of the catalyst material thereto. Various permutations of the process for producing the hereinabove described catalytic structure are disclosed in greater detail in copending applications Ser. Nos. 460,742; 460,786; 460,787; and 461,436 all filed Apr. 15, 1974 and 466,737 filed May 3, 1974, the disclosures of which are incorporated in this application by reference.

Figure 4A:
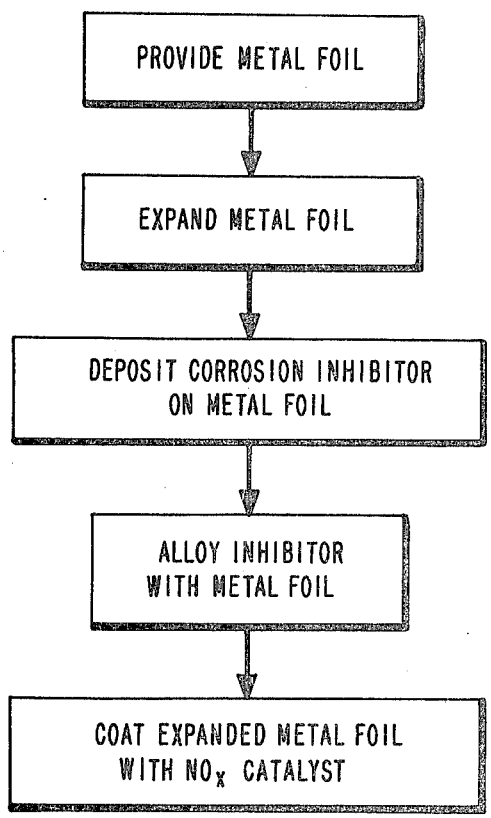
FIGS. 4a, 4b, 4c, 4d, and 4e are flow diagrams while illustrate preferred sequences of steps employed in the manufacture of the instant invention.

In FIGS. 4a, 4b, 4c, 4d, and 4e, flow diagrams are shown which illustrate different sequences of steps which may be employed in manufacturing the catalyst structure of the instant invention. FIG. 4a illustrates a sequence which comprises the steps of (1) providing a sheet of thin metal foil, (2) expanding the metal foil to thereby form a plurality of strands defining openings therebetween, (3) depositing a corrosion inhibiting metal on at least part of the surface of the expanded metal foil, (4) alloying the so-deposited metal with the metal foil, and (5) coating at least a part of the surface of the expanded metal foil with an adherent layer of an effective amount of a catalyst material which is capable of reducing $NO_x$.

Figure 4B:
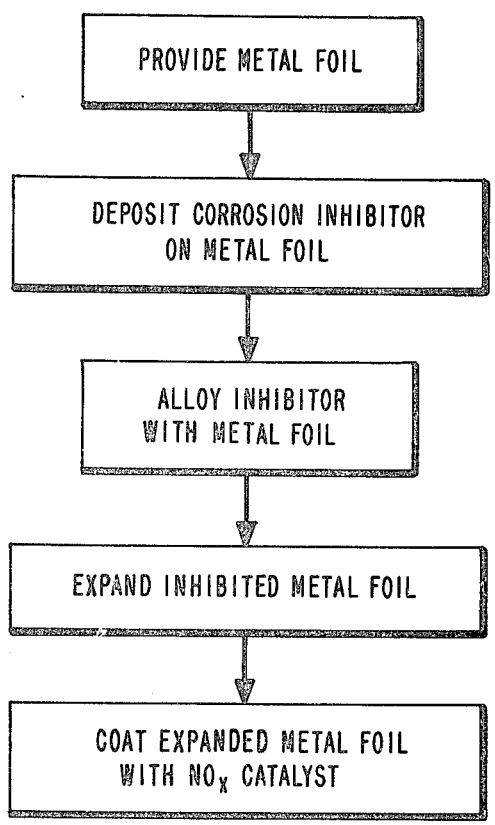

In FIG. 4b, illustrates a sequence of steps which comprises (1) providing a sheet of thin metal foil, (2) depositing a corrosion inhibiting metal on at least part of the surface of the metal foil, (3) alloying the so-deposited metal with the metal foil, (4) expanding the metal foil to thereby form a plurality of strands defining openings therebetween, and (5) coating at least a part of the surface of the expanded metal foil with an effective amount of a catalyst material which is capable of reducing $NO_x$.

Figure 4C:
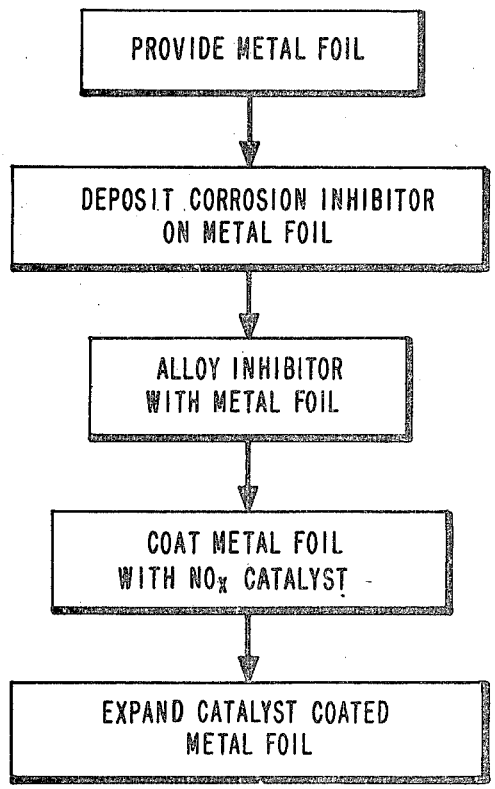

In FIG. 4c, a flow diagram is shown which illustrates a sequence of steps which comprising (1) providing a sheet of thin metal foil, (2) depositing a corrosion inhibiting metal on at least part of the surface of the metal foil, (3) alloying the so-deposited metal with the metal foil, (4) coating at least a part of the surface of the metal foil with an adherent layer of an effective amount of a catalyst material which is capable of reducing $NO_x$, and (5) expanding the catalyst coated metal foil to thereby form a sheet of expanded metal foil comprised of a plurality of strands defining openings therebetween.

Figure 4D:
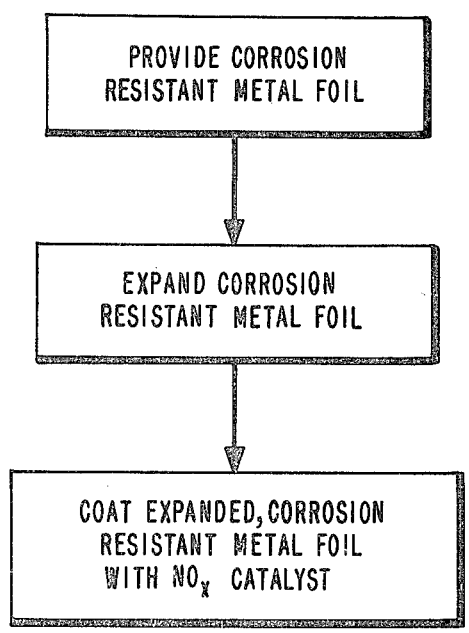

FIG. 4d illustrates a sequence which comprises the steps of (1) providing a sheet of corrosion resistant thin metal foil, (2) expanding the corrosion resistant metal foil to thereby form a plurality of strands defining openings therebetween, and (3) coating at least a part of the surface of the corrosion resistant expanded metal foil with an adherent layer of an effective amount of a catalyst material which is capable of reducing $NO_x$.

Figure 4E:
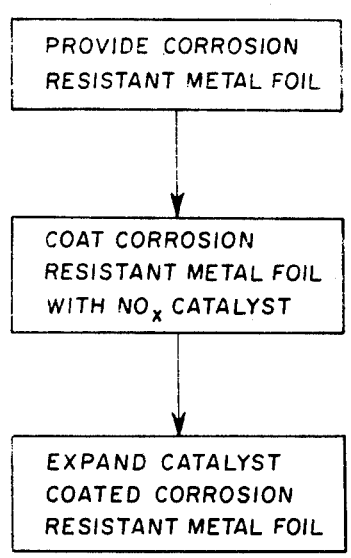

FIG. 4e illustrates the sequence of (1) providing a sheet of thin corrosion resistant metal foil, (2) coating at least a part of the surface of the metal foil with an adherent layer of an effective amount of a catalyst material which is capable of reducing $NO_x$, and (3) expanding the catalyst coated metal foil to thereby form a sheet of expanded metal foil comprised of a plurality of strands defining openings therebetween.

Figure 5A:
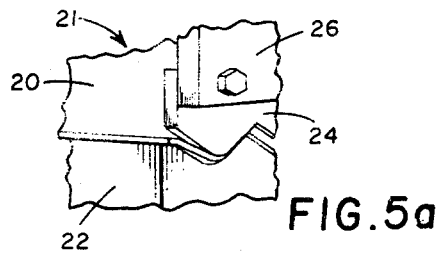
FIGS. 5a, 5b, 5c, and 5d are partly broken away, isometric views which illustrate the apparatus and sequence of steps commonly employed to produce a sheet of expanded metal foil.
Figure 5B:
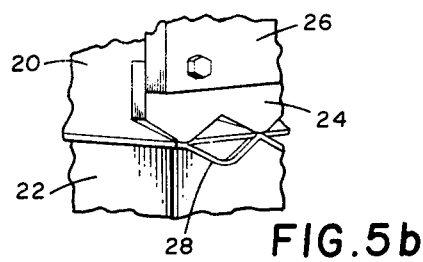
Figure 5C:
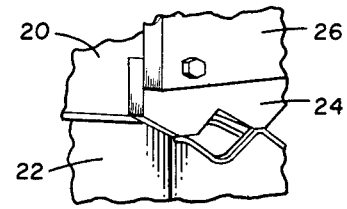
Figure 5D:
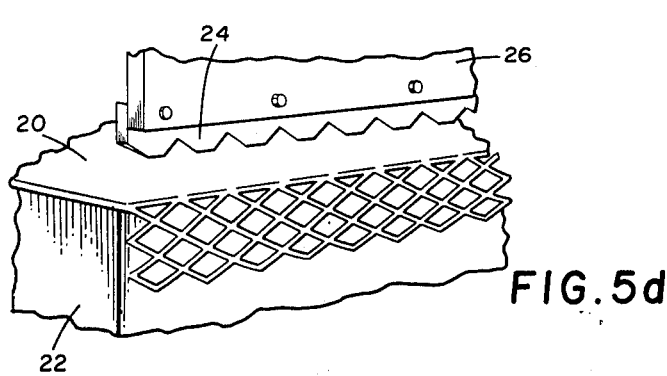

In FIGS. 5a, 5b, 5c and 5d there is illustrated the technique and apparatus commonly employed to produce a sheet of expanded metal. Specifically, in FIG. 5a there is shown a sheet of metal foil 20 which is to be expanded positioned on the machine bed 22 of an expanding apparatus 21 (not shown in detail) with the serrated cutting knife blade 24 of the expanding apparatus being in the down or cutting position. The movement of the knife blade 24 is controlled by ram 26 which, in turn, is actuated by a control mechanism which is not shown due to its conventional construction. After the metal foil is initially slit and stretched (as shown in FIG. 5a), the knife blade 24 moves up again and (as shown in FIG. 5b) to one side half the length of the individual V-shaped strands 28 formed during the preceding downward movement of the knife blade 24 while the sheet of metal foil 20 is advanced a controlled amount on the machine bed 22 by a feeding mechanism which is also not shown due to its conventional nature. Then, as illustrated in FIG. 5c, the knife blade 24 descends for another slitting and stretching step to complete the formation of the diamond shaped pattern which is characteristic of expanded metal. The knife blade 24 then retracts and moves back to its original position and the foregoing sequence is subsequently continued to produce the desired piece of expanded metal foil. FIG. 5d shows a sheet of metal foil which has been expanded to a sufficient degree to illustrate the formation of the diamond pattern which is so characteristic of expanded metal.

Figure 6:
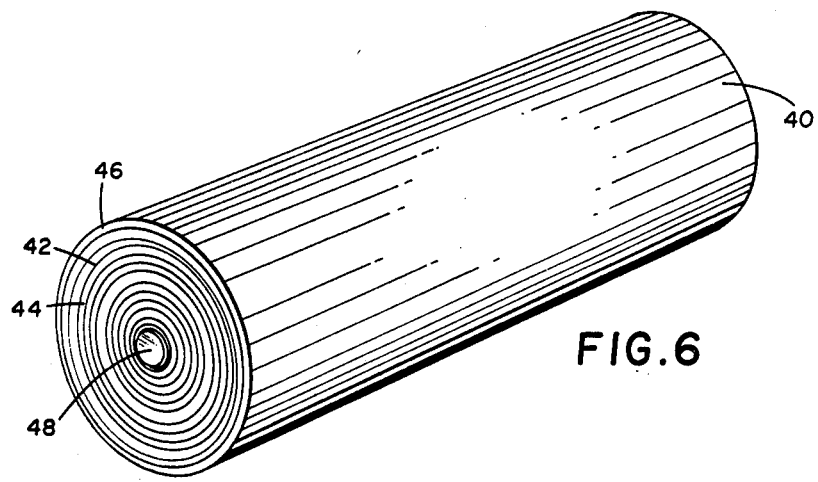
FIG. 6 is an isometric view showing a catalytic assembly composed of a sheet of catalytic material formed into coil and positioned inside of a suitable housing.

FIG. 6 shows a $NO_x$ reducing catalytic assembly 40 which consists of a sheet of expanded metal foil 42 having a $NO_x$ reducing catalyst on its surface which has been formed into a helical coil 44 and positioned inside of a suitable housing 46 through which $NO_x$ containing gases can be directed. The center of the helical coil 44 has been provided with a metal rod 48 which prevents any gas from passing through the center of the coil without coming into contact with the $NO_x$ reducing catalyst material deposited on the expanded metal foil.

Figure 7:
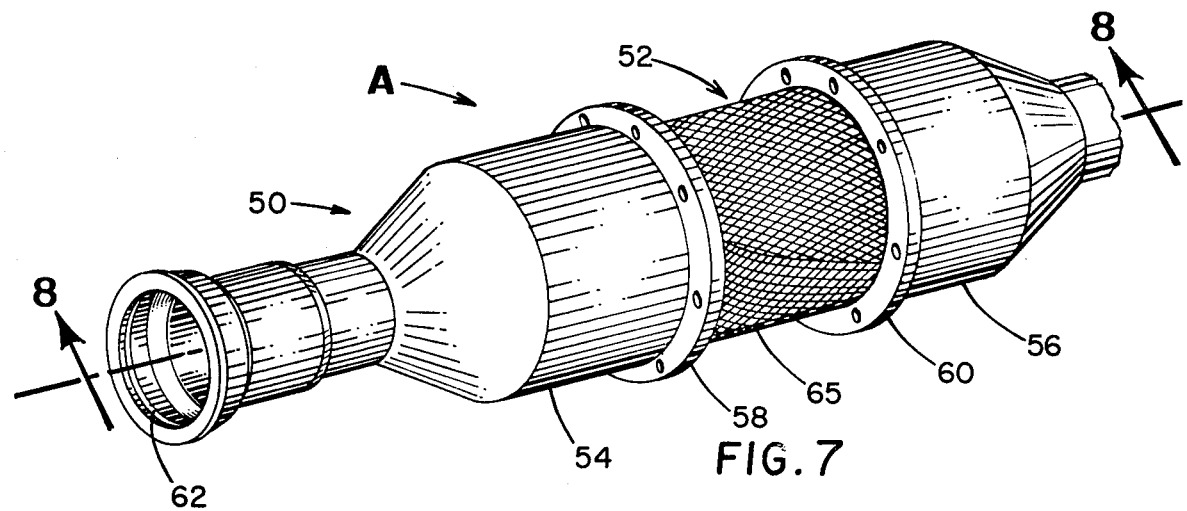
FIG. 7 is an exploded pictorial view showing an $NO_x$ reducing catalyst structure formed in accordance with the preferred embodiment of the invention.
Figure 8:
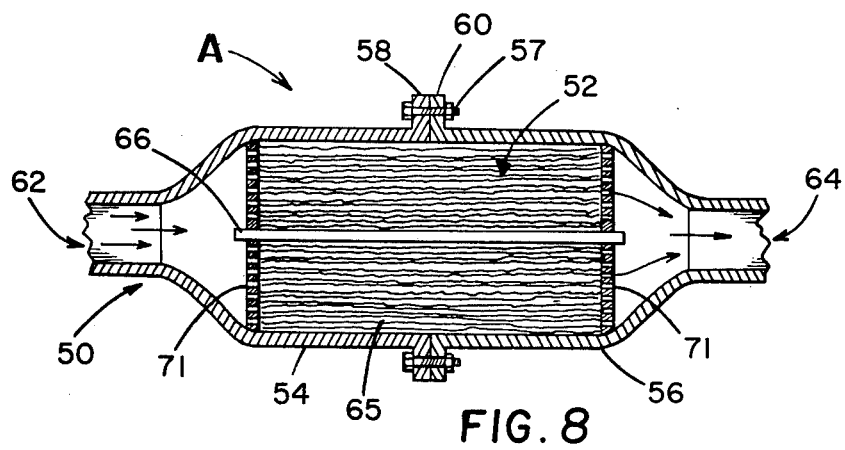
FIG. 8 is a longitudinal cross-sectional view through the device of FIG. 7 showing the device in assembled relationship (the view is taken on line 8—8 of FIG. 7)

FIGS. 7 and 8 show the overall arrangement of a $NO_x$ reducing assembly A which includes a housing 50 adapted to be mounted in the exhaust system of an internal combustion engine. Carried within the housing 50 is the catalytic structure 52. In the embodiment under consideration, structure 52 is sized and located in the housing 50 in a manner such that all, or substantially all, of the gas passing through the housing is required to pass through the catalytic structure 52.

The actual structural configuration and details of the housing 50 are not particularly critical to the invention and many different types of housing could be used. In the subject embodiment, however, housing 50 comprises a pair of generally bell-shaped sections 54 and 56 which are separably joined by suitable bolts 57 which interconnect mating flanges 58 and 60. Bell sections 54 and 56 together define a flow passage having inlet and outlet openings 62, 64 respectively. In the embodiment shown, inlet and outlet openings 62, 64 are arranged to receive the exhaust pipes of an internal combustion engine. It should be understood that the material from which the housing is formed could vary widely provided it has the necessary strength and durability to withstand the operating conditions and temperatures which may be as high as 1100° F. to 1700° F.

Positioned within housing 50 is the catalytic structure 52. According to the invention, the structure 52 comprises a mass or arrangement of thin, apertured metal foil which is relatively tightly compacted. In the subject embodiment, the foil is an expanded metal foil 65 which is wound tightly upon a small steel mandrel 66 to a diameter to be closely received within the housing 50. The geometric relationship between the foil, the exterior of the mandrel 66 and the interior of the housing 50 should be such as to effectively eliminate paths through which exhaust gases may pass without the requisite impingement upon the catalytic metal foil.

In the preferred embodiment of the invention, the thin metal foil usually has a thickness of about 0.010 inch or less, preferably in the range from 0.001 to 0.010 inches. In actual practice, it has been found most desirable to employ thin metal foil having a thickness ranging from about 0.002 inches to about 0.006 inches. However, the exact thickness to be employed depends on such variables as the type of metal or alloy used as the substrate, the type of automotive exhaust environment the resultant catalytic structure will actually experience and the specific $NO_x$ catalyst utilized, together with other factors.

According to another aspect of the invention, the expanded foil sheet preferably has a surface area to mass ratio of between approximately 16 and 2 square inches per gram as determined by linear dimension only. Additional surface area can be obtained by conventional substractive, additive or other roughening surface treatment.

Referring again to FIGS. 7 and 8, it will be seen that the expanded foil 65 is tightly wound upon the mandrel 66 in stacked, ever increasing convolutions. The strip is wound tightly on the mandrel so that the resulting foil arrangement has a large void volume and a density of in the range of approximately 2 to 12 percent the density of an equivalent solid volume of the metal from which the foil is made. This can vary, of course, depending upon the foil and the expanding parameters. However, merely by way of comparison, this structure has about one-tenth the mass of the prior art saddle bed. This increases the heat-up rate by about a factor of four.

Because of the nature of the foil and the winding process, the openings 14 in each layer are somewhat randomly located relative to those in adjacent layers. The resulting assembly thus provides a large number of circuitous flow paths so that as gas passes through the assembly it is continually subject to changes in flow direction resulting in repeated inpingement of the gas molecules with the catalytic surface of the foil. However, because of the large number of voids and relatively low density of the foil arrangement, the back-pressure is comparatively low.

In the structural embodiment of FIGS. 7 and 8, the ends of the foil arrangement are protected by perforated metal plates 71 which are, for example, press-fitted on mandrel 66. These plates are desirable in that they prevent crushing of the ends of the foil arrangement during handling, shipping, etc. Also, under some operating conditions, the ends could possibly be damaged if the plates were not present.

Figure 9:
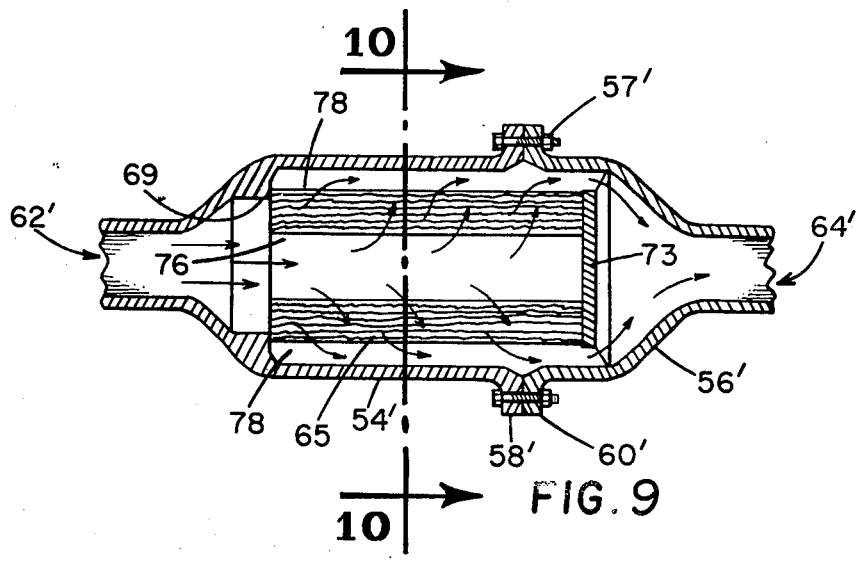
FIG. 9 is a longitudinal cross-sectional view similar to FIG. 8 but showing a modified form of the invention.

FIG. 9 shows a modified form of structure embodying the invention. In this embodiment, the housing is illustrated as generally the same as that shown in the FIGS. 7 and 9 embodiment and accordingly the same reference numerals differentiated by a prime (') suffix have been used to identify corresponding elements. A description of the FIGS. 7 and 8 element is to be taken equally applicable unless otherwise noted. The main difference shown in the housing construction is that bell section 54' is somewhat longer than bell section 56'. Also, an internal shoulder 69 is formed within bell section 54'.

Figure 10:
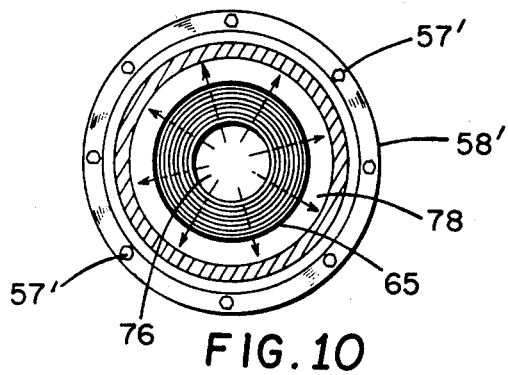
FIG. 10 is a cross-sectional view taken on line 10—10 of FIG. 9.

The expanded metal foil 65 is tightly wound into a spiral assembly having an open inner diameter 76 which is of a diameter approximately equal to the inlet 62. The outer diameter of the assembly is, however, less than the inner diameter of the housing. This provides an open flow passage 78 circumferentially about the spiral wound foil arrangement. The catalytic structure is positioned in the housing and a baffle or plate 73 extends across the end of the foil arrangement as shown. The plate 73 is suitably supported from the housing in a manner which will not greatly impede flow about the edges of the plate but will prevent flow axially through the mass. As it can be appreciated, in this embodiment, the gas entering the housing is caused to flow generally radially through the mass as shown in FIG. 10.

Figure 11:
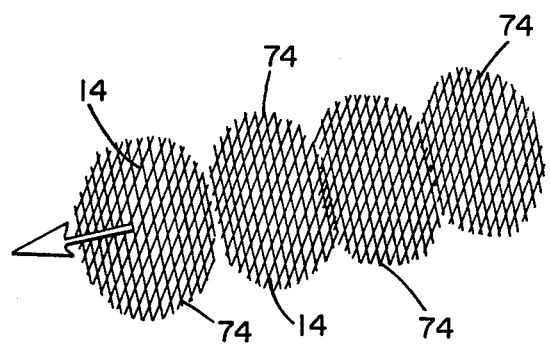
FIG. 11 is an exploded pictorial view showing a modified form of foil mass for the assembly.

FIG. 11 illustrates a third manner in which the foil mass can be formed. In this embodiment, the foil arrangement is formed from a multiplicity of discs or wafers 74 of the foil 65. The discs are merely tightly stacked together in aligned relationship. The openings 14 in each disc are, however, preferably randomly located relative to those in adjacent discs. The flow arrow in FIG. 11 shows gas flow as taking place axially through the mass. This is preferred but the foil arrangement could also be used in environments where flow takes place through its diameter.

The total surface area required for a given installation will, of course, depend upon the catalyst used, the quantity of $NO_x$ in the exhaust gas, the volume of gas, and various other operating conditions. In any case, it will be recognized that the mass of catalytic structure necessary to produce a given required surface area is much reduced relative to prior art structures through the application of the concepts herein disclosed.

Figure 12:
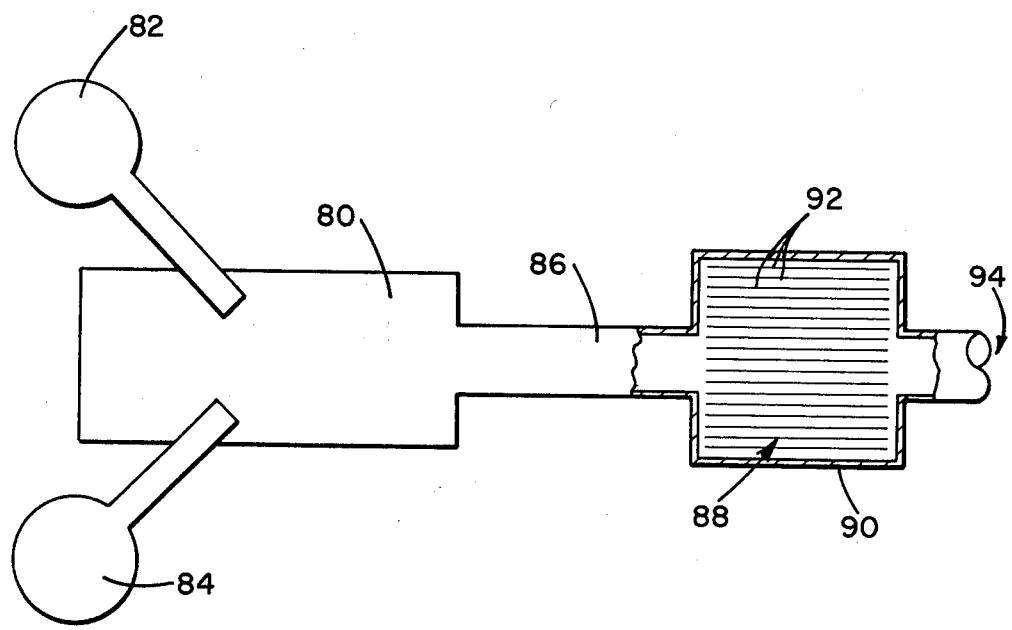
FIG. 12 is a diagrammatical illustration of the system of the invention.

In FIG. 12 there is shown the system of the invention for catalytically reducing $NO_x$ found in the exhaust stream of the internal combustion engine which systen includes an internal combustion engine 80 having communicating therewith a source of fuel 82 and a source 84 of an oxidant (oxygen from air) for the fuel. During operation of the internal combustion engine 80 exhaust gases are generated which pass through the manifold or conduit 86 into the $NO_x$ reducing catalyst assembly or apparatus 88 which includes a housing 90 having a $NO_x$ reducing catalyst structure 92 composed of a sheet of expanded thin metal foil of the type and composition described herein with a suitable nickel-copper $NO_x$ reducing catalyst material deposited on the surface thereof positioned therein. The exhaust gases, after $NO_x$ reduction, then exit from port 94. The catalyst structure 92 therein, by catalytic reduction, affects the removal of a significant amount of $NO_x$ therefrom, and the so-treated gases are characterized by the fact that a significant amount of $NO_x$ has been removed.

The metal foil or substrate to be used in the practice of the instant invention can be produced by various well known metal forming techniques. For example, it can be produced by electrodeposition, by hot or cold working ingots or other cast forms of the base material to form a sheet of wrought metal foil, or it can be produced by powder metallurgy techniques, i.e., by coherently bonding metal powders together, with or without binders, followed by simultaneous or subsequent heating to produce a coalesced, sintered metal or alloy. As all of the foregoing techniques are well known in the art, for the sake of brevity, they will not be discussed herein in great detail.

The base metal foil is, optionally, annealed in a furnace at a suitable temperature and thereafter expanded to provide an apertured metal structure having a thickness of less than about 10 mils. The annealing step facilitates the expanding operation only and appears to be otherwise not necessary.

The exact technique employed in expanding the metal foil in the practice of the herein described invention is not critical. For example, it is possible to expand the metal foil by appropriately slitting the metal foil and then subsequently stretching it by the application of a suitable tensional force. However, the expanding technique which has been found to be especially suitable for forming the type of thin metal foil used in the practice of the instant invention is that shown in FIGS. 5a through 5d. In this method of manufacturing an expanded metal, a solid sheet of metal is fed over the edge of the bed of an expanding machine and a serrated knife blade slits and stretches a thin section of the edge of the metal sheet to thereby form a plurality of V-shaped metal strands. The knife then moves up again and slides over in a given direction half the length of initial individual V-shaped strands while the sheet metal foil is advanced on the machine bed in a controlled manner. The knife then descends for another slitting and stretching operation. Subsequently, the knife blade is retracted and the foregoing series of steps is repeated whereby an expanded metal structure is obtained. In this type of expanding operation, the individual strands which make up the resultant expanded metal structure are turned or distorted such that the place of their surface is now at an angle with respect to the plane of the surface of the original unexpanded foil sheet. From test data obtained to date, it has been observed that supported $NO_x$ reducing catalysts formed by metallurgically bonding a catalyst, such as a nickel copper alloy, to a substrate of the type described exhibit excellent $NO_x$ reducing qualities. As the expanding process has already been described hereinabove, it will not be described herein in further detail.

While the discussion herein has, in the main, concerned an open mesh substrate structure obtained by expanding metal, it will be readily appreciated by those skilled in the art that a useful open mesh structure can also be achieved by such techniques as slip casting, roll forming, perforating metal sheet, direct electroplating of an open mesh structure, joining strands of fibers together and the like. Expanded foil, however, gives vastly superior results over other open mesh substrate materials.

In the preferred practice of the system of the invention the internal combustion engine is operated in a manner such that the exhaust gases therefrom contain relatively low amounts of unreacted oxygen. Preferably less than 1 volume percent of unreacted oxygen is present. Usually, this is accomplished by operating the engine with an air/fuel ratio on the rich side of stoichiometric (rich referring to excess fuel) which is primarily achieved by adjusting the carburetion setting. It is also contemplated to utilize fuel injection as well as other conventional means to supply the engine with the necessary amounts of fuel and oxidant therefor. In the preferred practice of the system of the instant invention it is generally desirable to operate the internal combustion engine in a manner such that the air/fuel ratio generally ranges from about 13.8 to 1 to about 14.5 to 1. However, it will be appreciated by those skilled in the art that depending on the specific fuel utilized, the type of catalyst employed and the temperature at which the gases contact the concerned catalyst this ratio may vary slightly. In general, it can be stated that the ratio of carbon monoxide to oxygen found in the exhaust gas should range from about two to one up to about ten to one, preferably up to about six to one. Clearly, a net reducing atmosphere is to be provided. Additional details regarding the oxygen content of exhaust gases may be found in Kearby et al, U.S. Pat. No. 3,565,574.

The instant invention can be better understood by reference to the following examples which are set forth herein for illustrative purposes only and are not intended to limit the scope of the instant invention.

EXAMPLE 1

A sheet of electrodeposited nickel foil having a thickness of about 0.005 inches was expanded by conventional techniques to produce an open mesh expanded structure having a strand width of about 0.010 inches and about 10 holes per inch. This sheet of expanded nickel foil was then electroplated with chromium until a 20 percent increase in weight was achieved. Subsequently, the chromium was alloyed with the nickel foil by heating the so-coated expanded foil structure at sub-atmospheric pressures (½ atmosphere of argon) at a temperature of about 2200° F. for a period of about 2 hours. The composition of the resulting substrate was about 80 weight percent nickel and about 20 weight percent chromium. The complete surface of the so-produced substrate was then electroplated with copper to provide a coating thickness of about 0.0002 inches. The copper was then diffusion bonded to the substrate by heating the copper coated article at sub-atmospheric pressure (½ atmosphere of argon) to a temperature of about 1900° F. for about 2 hours. The resulting surface chemistry of the outer (catalytic) coating as determined by an electron microprobe was 3 percent chromium, 15 percent nickel and the balance copper. A typical surface composition of the intermediate zone after the final diffusion was 30 percent chromium, 8 percent copper and the balance nickel. The catalytic layer constituted about 6 weight percent of the catalytic structure. A one inch diameter disc of the foregoing catalytic structure had a surface area of about 0.78 square inches.

EXAMPLE 2

A catalytic structure was produced as described in Example 1 except that:
(1) the open mesh, expanded nickel base structure has a strand width of 0.015 inches, and
(2) the resultant structure of Example 1 was provided electrolytically on all surfaces with a 0.0002 inch thick coating of nickel which was diffused into the catalytic structure by heating it in a reduced atmosphere (½ atmosphere of argon) at 1900° F. for 2 hours. A one inch diameter disc of the catalytic structure of this example had a surface area of about 0.75 square inches.

An examination of the resultant catalytic structure showed that the surface of the catalytic layer contained about 10 weight percent chromium, 49 weight percent nickel and 41 weight percent copper, and that the catalytic layer constituted about 12 weight percent of the catalytic structure, excluding the surface chromium. A typical intermediate zone surface composition was 30 percent chromium, 8 percent copper and the balance nickel.

EXAMPLE 3

A catalytic structure was produced as described in Example 2 except that:
(1) the thickness of the electrodeposited nickel foil was 0.002 inches, and
(2) the catalyst layer consisted of nickel only which was applied to the substrate by electroplating a 0.001 inch thick layer of nickel on all surfaces of the substrate and then metallurgically bonding the catalytic layer and substrate together by heating the composite structure at 1900° F. for 2 hours at sub-atmospheric pressure (½ atmosphere).

A metallurgical examination of the resultant catalytic structure showed that the surface of the catalytic layer consisted of essentially 100 weight percent nickel and that the catalytic layer constituted about 45 weight percent of the catalytic structure. The typical intermediate zone composition was 38 percent chromium and the balance nickel.

EXAMPLE 4

A sheet of electrodeposited nickel foil having a thickness of about 0.004 inches is expanded by conventional techniques to produce an open mesh expanded structure having a strand width of about 0.015 inches and about 10 holes per inch. This sheet of expanded nickel foil is then electroplated on all of its surfaces with a 0.001 inch thick layer of cobalt. The cobalt is then diffused into the nickel foil by heating to a temperature of about 2200° F. for about 2 hours under sub-atmospheric conditions (½ atmosphere of argon). Subsequently, this sheet of expanded nickel-cobalt foil is then electroplated with chromium until a 20 percent increase in weight is achieved. The chromium is alloyed with the nickel-cobalt foil by heating the so-coated expanded foil metal structure in a ½ atmosphere of argon at a temperature of about 2200° F. for a period of about 2 hours. The chemical composition of the resulting substrate is about 53 weight percent nickel, about 27 weight percent cobalt and about 20 weight percent chromium. The complete surface of the so-produced substrate is then electroplated with nickel to provide a coating thickness of about 0.001 inches. The nickel is then diffusion bonded to the substrate by heating the nickel-coated article at reduced pressure (½ atmosphere of argon) to a temperature of about 1900° F. for about 2 hours.

The catalytic layer on the resultant catalytic structure is essentially nickel and constitutes about 21 weight percent of the catalytic structure.

EXAMPLE 5

A sheet of electrodeposited iron having a thickness of about 0.001 inch is expanded by conventional techniques to produce an open mesh structure having a strand width of about 0.015 inches and 10 holes per inch. This sheet of expanded iron foil is then electroplated with a 0.001 inch layer of nickel. The nickel is then diffused into the iron foil by heating at sub-atmospheric pressures (½ atmosphere of argon) at a temperature of about 2200° F. for about 2 hours. The so-produced iron-nickel structure is electroplated with chromium until a 20 percent increase in weight is achieved. Subsequently, the chromium is alloyed with the iron-nickel structure by heating in a ½ atmosphere of argon at a temperature of about 2200° F. for a period of about 2 hours. The resulting substrate's composition is about 25 weight percent iron, about 55 weight percent nickel and about 20 weight percent chromium. The complete surface of the so-produced substrate is electroplated with a layer of nickel 0.001 of an inch thick. The nickel catalytic material is then diffusion bonded to the substrate by heating the resultant structure at a reduced pressure of about ½ atmosphere of argon to a temperature of about 1900° F. for a period of about 2 hours.

The catalytic layer on the resultant structure is similar in type to that described in Example 4. However, in the present Example, the catalytic layer constitutes about 36 weight percent of the catalytic structure.

EXAMPLE 6

A catalytic structure is produced as described in Example 5 above except that after the nickel is electroplated on the iron base, a 0.0005 inches thick coating of cobalt is plated on the iron-nickel base structure and subsequently alloyed therewith by heating in a reduced atmosphere (½ atmosphere or argon) at a temperature of 2200° F. for a period of about 2 hours, and that after the chromium is diffused into the iron-nickel-cobalt structure, 0.0003 inches of aluminum are vapor plated on all of the surfaces thereof and then diffused therein by heating in a reduced atmosphere (½ atmosphere of argon) at a temperature of about 1900° F. for about 8 hours. The composition of the above-described substrate is about 40 weight percent nickel, 20 weight percent cobalt, 17 weight percent iron, 19 weight percent chromium and 4 weight percent aluminum.

An analysis of the resultant catalytic structure showed that the catalytic layer constitutes about 28 weight percent of the catalytic structure.

EXAMPLE 7

A sheet of electrodeposited iron foil having a thickness of about 0.002 inches was expanded by conventional techniques to produce an open mesh expanded structure having a strand width of about 0.010 inches and about 10 holes per inch. This sheet of expanded iron foil was then electroplated with chromium until about a 20 percent increase in weight was achieved. The chromium was then alloyed with the iron foil by heating the so-coated expanded foil structure at sub-atmospheric pressures (½ atmosphere of argon) at a temperature of about 2200° F. for a period of about 8 hours. Subsequently, the iron-chromium structure was vapor plated on all surfaces with 4 weight percent of aluminum. The aluminum was diffusion alloyed with the iron-chromium structure by heating for about 8 hours at about 1900° F. at sub-atmospheric pressure of ½ atmosphere of argon. The composition of the resulting substrate was about 77 percent iron, about 19 weight percent chromium and 4 weight percent aluminum. The complete surface of the so-produced substrate was then completely electroplated with a 0.0008 inch thick layer of nickel and a 0.0002 inch layer of copper. The nickel-copper plate was then diffusion bonded (alloyed) to the substrate by heating the so-coated article at reduced pressure (½ atmosphere of argon) to a temperature of about 1900° F. for about 2 hours.

An analysis of the resultant catalytic structure showed that the catalytic layer contained about 80 weight percent nickel and 20 weight percent copper and that the catalytic layer constituted about 46 weight percent of the catalytic structure.

EXAMPLE 8

A catalytic structure was produced as described in Example 7 except that the expanded iron structure was completely electroplated with 0.0005 inches of cobalt before the chromium was plated thereon and the resultant structure diffusion alloyed by heating at 2200° F. for 8 hours in ½ atmosphere of argon.

The composition of the resultant substrate was about 49 weight percent iron, 28 weight percent cobalt, 19 weight percent chromium and 4 weight percent aluminum.

An analysis of the resultant catalytic structure showed that the catalytic layer contained about 80 weight percent nickel and about 20 weight percent copper and that the catalytic layer constituted about 36 weight percent of the catalytic structure.

EXAMPLE 9

A sheet of electrodeposited cobalt foil having a thickness of about 0.005 inches is expanded by conventional techniques to produce an open mesh expanded structure having a strand width of about 0.010 inches and about 10 holes per inch. This sheet of expanded cobalt foil is then electroplated with chromium until a 20 percent increase in weight was achieved. Subsequently, the chromium is alloyed with the cobalt foil by heating the so-coated expanded foil structure at sub-atmospheric pressures (½ atmosphere of argon) at a temperature of about 2200° F. for a period of about 2 hours. The composition of the resulting substrate is about 80 percent cobalt and 20 weight percent chromium. The complete surface of the so-produced substrate is then electroplated with copper to provide a coating thickness of about 0.0001 inches. The copper is then diffusion bonded to the substrate by heating the copper coated article at sub-atmospheric pressure (½ atmosphere of argon) to a temperature of about 1900° F. for about 2 hours.

An analysis of the resultant catalytic structure shows that the surface of the catalytic layer contains about 3 weight percent chromium, about 15 weight percent cobalt, with the balance copper and that the catalytic layer constitutes about 6 weight percent of the catalytic structure.

EXAMPLE 10

A catalytic structure is produced as described in Example 9 except that:
(1) the open mesh, expanded cobalt base structure has a strand width of 0.015 inches, and
(2) the resultant structure of Example 9 is provided electrolytically with a 0.0002 inch thick coating of nickel which is diffused into the catalytic structure by heating it in a reduced atmosphere (½ atmosphere of argon) at 1900° F. for 2 hours.

An analysis of the resultant catalytic structure shows that the surface of the catalytic layer contains about 10 weight percent chromium, 49 weight percent nickel and 41 weight percent copper and that the catalytic layer constitutes about 12 weight percent of the catalytic structure.

EXAMPLE 11

A sheet of electrodeposited cobalt foil having a thickness of about 0.004 inches is expanded by conventional techniques to produce an open mesh expanded structure having a strand width of about 0.015 inches and about 10 holes per inch. This sheet of expanded cobalt foil is then electroplated on all of its surfaces with a 0.001 inch thick layer of nickel. The nickel is then diffused into the cobalt foil by heating to a temperature of about 2200° F. for about 2 hours under sub-atmospheric conditions (½ atmosphere of argon). Subsequently, this sheet of expanded cobalt-nickel foil is then electroplated with chromium until a 20 percent increase in weight is achieved. The chromium is alloyed with the cobalt nickel foil by heating the so-coated expanded foil metal structure in a one-half atmosphere of argon at a temperature of about 2200° F. for a period of about 2 hours.

The chemical composition of the resulting substrate is about 53 weight percent cobalt, about 27 weight percent nickel and about 20 weight percent chromium. The complete surface of the so-produced substrate is then electroplated with nickel to provide a coating thickness of about 0.001 inches. The nickel is then diffusion bonded to the substrate by heating the nickel-coated article at reduced pressure (½ atmosphere of argon) to a temperature of about 1900° F. for about 2 hours.

The catalytic layer on the resultant catalytic structure consists of essentially 100 weight percent nickel. In the present example the catalytic layer constitutes about 21 weight percent of the catalytic structure, with the remainder being the substrate.

EXAMPLE 12

A sheet of electrodeposited iron foil having a thickness of about 0.002 inches is expanded by conventional techniques to produce an open mesh expanded structure having a strand width of about 0.015 inches and about 10 holes per inch. This sheet of expanded iron foil is then electroplated on all of its surfaces with about a 0.0007 inch thick layer of nickel. Subsequently, this sheet of nickel coated, expanded iron foil is then electroplated with chromium until an increase in weight slightly in excess of 30 percent is achieved. The nickel and chromium are then alloyed with the iron foil by heating the so-coated expanded foil metal structure at a temperature of about 2200° F. for a period of about 8 hours at sub-atmospheric pressure (½ atmosphere of argon). The chemical composition of the resulting substrate is about 39 weight percent iron, about 31 weight percent nickel and slightly in excess of about 30 weight percent chromium. The complete surface of the so-produced substrate is then electroplated with 0.0008 inches of nickel and 0.0002 inches of copper to provide a coating thickness of about 0.001 inches. The nickel and copper are then diffusion bonded to the substrate by heating the coated article at reduced pressure (½ atmosphere of argon) at a temperature of about 1900° F. for about 2 hours.

The catalytic layer on the resultant catalytic structure is essentially 80 weight percent nickel and 20 weight percent copper and constitutes about 31 weight percent of the catalytic structure.

EXAMPLE 13

A sheet of electrodeposited iron having a thickness of about 0.002 inches is expanded by conventional techniques to produce an apertured structure having a strand width of about 0.015 inches and 10 holes per inch. This sheet of expanded iron foil is then electroplated on all sides with a 0.0006 inch thick layer of nickel. Subsequently, a thin layer of cobalt (about 0.003 mils thick) is electroplated thereon. The so-produced structure is then electroplated with chromium until an increase in weight in excess of 30 weight percent is achieved. Subsequently, the chromium is alloyed with the so-coated cobalt structure by heating at a temperature of about 2200° F. for a period of about 2 hours at reduced pressure of about ½ atmosphere of argon. The resulting substrates composition is about 41 weight percent iron, about 28 weight percent nickel, 1 weight percent cobalt and in excess of about 30 weight percent chromium. The complete surface of the so-produced substrate is electroplated with a layer of nickel and copper as described in Example 12. The catalytic material is then diffusion bonded to the substrate by heating the resultant structure at a reduced pressure of about ½ atmosphere of argon at a temperature of about 1900° F. for a period of about 2 hours.

The catalytic layer on the resultant structure is similar in type to that described in Example 12 and constitutes about 31 weight percent of the catalytic structure.

The following example illustrates the $NO_x$ reducing system of the invention:

EXAMPLE 14

(a) An internal combustion engine having associated therewith a conventional carburetion system for supplying fuel and oxygen to the engine is provided, with the carburetor therefor being pre-set to have an air to fuel ratio of about 14.2 to 1.

(b) The engine was operated rich so as to cause the exhaust gases to contain a low amount of unreacted oxygen.

(c) The exhaust gases emanating from the engine were then brought into contact with a $NO_x$ reducing catalyst consisting of an expanded metal substrate composed of an iron base alloy (about 70 weight percent iron and containing about 30 weight percent chromium) which had on the surface thereof a layer of a $NO_x$ reducing catalyst material composed of about 95 weight percent nickel and 5 weight percent copper.

The exhaust gases before contacting the $NO_x$ reducing catalyst material contained about 0.6 volume percent oxygen and about 600 ppm of $NO_x$. The temperature at which the exhaust gases were brought into contact with the $NO_x$ reducing catalyst material was about 1210° F. An analysis of the gases emanating from the $NO_x$ reducing catalyst assembly showed that the oxygen content thereof was about 0.02 volume percent and that the $NO_x$ content had been reduced to about 1.8 ppm.

(d) The so-treated exhaust gases, containing about 1.65 volume percent carbon monoxide and about 210 ppm unburned hydrocarbon gases (as butane), were then brought into contact with a conventional oxidation catalyst in an oxygen containing atmosphere. The catalyst employed was a honeycomb structure of alumina having deposited on the surface thereof active platinum. The amount of carbon monoxide and hydrocarbon gases found in the so-treated exhaust gases was about 0.04 volume percent and 60 ppm, respectively. The net $NO_x$ conversion or reduction was about 94 percent.

The following examples are illustrative of the method of manufacturing the catalytic structures of the invention:

EXAMPLE 15

A supported catalyst capable of catalytically reducing the $NO_x$ gases found in the exhaust stream of the internal combustion engine is produced as follows:

(a) A sheet of wrought nickel foil about 15 feet long and 4 inches wide having a thickness of about 0.002 inches is obtained.

(b) This sheet of nickel foil is then expanded by use of a conventional expanding apparatus so that the resultant expanded metal structure has a strand width of about 0.015 inches and contains about 5 diamond-shaped openings per inch of width.

(c) This sheet of expanded nickel foil is then electroplated with chromium until a weight increase of about 20 percent is achieved.

(d) The chromium is then alloyed with the nickel foil by heating the so-coated expanded metal foil structure at a temperature of about 2200° F. for a period of about 2 hours under sub-atmospheric conditions (at a pressure of about one-half an atmosphere of argon). The composition of the resultant metal foil substrate is about 80 weight percent nickel and about 20 weight percent chromium.

(e) The complete surface of the so-produced nickel base substrate is then electroplated with nickel to provide a coating having a thickness of about 0.0002 inches thick. Subsequently, a coating of copper about 0.0002 inches thick is electrolytically overplated on the nickel coated substrate. The copper and nickel are then alloyed together and diffusion bonded to the substrate by heating the so-coated article to a temperature of about 1900° F. for a period of about 2 hours at sub-atmospheric pressures (one-half atmosphere of argon).

EXAMPLE 16

A $NO_x$ supported catalyst capable of catalytically reducing the $NO_x$ gases found in the exhaust stream of the internal combustion engine is produced as follows:

(a) A sheet of metal foil about 15 feet long by about 4 inches wide by about 0.002 inches thick consisting of about 60 weight percent nickel and about 40 weight percent iron is provided. This sheet of metal foil is formed by slurry casting pre-alloyed nickel-iron particles followed by sintering to produce a dense sheet material.

(b) This sheet of nickel-iron foil is then expanded by the technique described in Example 15.

(c) Chromium is then deposited on the expanded nickel foil structure as is described in Example 15.

(d) The so-deposited chromium is then alloyed with the nickel-foil structure as is described in Example 15.

(e) Aluminum is then vapor deposited on the expanded metal foil so as to produce a substrate which contains about 4 weight percent aluminum. The aluminum is then alloyed with the substrate by heating to about 1900° F. for a period of about 30 minutes at sub-atmospheric pressure (one-half atmosphere of argon).

(f) The so-formed, expanded nickel-iron base foil substrate is then coated with a $NO_x$ reducing catalytic material consisting of about 80 weight percent nickel and about 20 weight percent copper by the technique described in Example 15.

EXAMPLE 17

A $NO_x$ supported catalyst capable of catalytically reducing the $NO_x$ gases found in the exhaust stream of the internal combustion engine is produced as follows:

(a) A sheet of electrolytically produced metal foil consisting of about 20 weight percent nickel, about 60 weight percent cobalt and about 20 weight percent iron, about 15 feet long by about 4 inches wide by about 0.002 inches thick is obtained.

(b) This sheet of nickel-cobalt-iron metal foil is then expanded by the technique described in Example 15.

(c) Chromium is deposited on the expanded metal foil by the technique described in Example 15.

(d) The chromium is then alloyed with the nickel-cobalt-iron expanded metal foil by the technique described in Example 15.

(e) A $NO_x$ reducing catalytic layer consisting of about 80 weight percent nickel and about 20 weight percent copper is then deposited on the surface of the expanded nickel-cobalt-iron foil by the technique described in Example 15. The thickness of the so-deposited catalytic layer is 0.0002 inches.

EXAMPLE 18

A catalyst capable of catalytically reducing the $NO_x$ component of exhaust gases emanating from the internal combustion engine is produced as follows:

(a) A sheet of electrodeposited nickel foil about 15 feet long by about 4 inches wide by about 0.002 inches thick is obtained.

(b) This sheet of nickel foil is then electroplated with chromium until a weight increase of about a 20 percent is achieved.

(c) The chromium is then alloyed with the nickel foil by heating the so-coated sheet of metal foil at a temperature of about 2200° F. for a period of about 2 hours under sub-atmospheric conditions (at a pressure of about one-half an atmosphere of argon). The composition of the resultant metal foil substrate is about 80 weight percent nickel and about 20 weight percent chromium.

(d) This sheet of nickel foil is then expanded by use of a conventional expanding apparatus so that the resultant expanded metal structure has a strand width of about 0.015 inches and contains about 5 diamond-shaped openings per inch of width.

(e) The complete surface of the so-produced expanded nickel-chromium substrate is then electroplated with nickel to provide a nickel coating having a thickness of about 0.0002 inches. The nickel catalyst is then diffusion bonded to the metal foil substrate by heating the nickel coated article to a temperature of about 1900° F. for about 2 hours at sub-atmospheric pressures (about ½ atmosphere of argon).

EXAMPLE 19

A catalyst capable of catalytically reducing the $NO_x$ component of exhaust gases emanating from the internal combustion engine is produced as follows:

(a) A sheet of wrought metal foil consisting of about 60 weight percent nickel and about 40 weight percent iron, about 15 feet long by about 4 inches wide by about 0.002 inches thick is obtained.

(b) Chromium is deposited on the wrought nickel-iron foil by the technique described in Example 18.

(c) The chromium is alloyed with the nickel-iron foil by the technique described in Example 18.

This sheet of wrought nickel-iron foil is then expanded by the technique described in Example 18.

(c) Nickel and copper are electrolytically co-deposited on the surface of the expanded foil substrate so as to produce a catalytic coating consisting of about 80 weight percent nickel and about 20 weight percent copper. The so-obtained catalytic coating is approximately 0.0002 inches thick.

EXAMPLE 20

A catalyst capable of catalytically reducing the $NO_x$ component of exhaust gases emanating from the internal combustion engein is produced as follows:

(a) A sheet of wrought metal foil consisting of about 20 weight percent nickel, about 60 weight percent cobalt and about 20 weight percent iron, about 15 feet long by about 4 inches wide by about 0.002 inches thick is obtained.

(b) Chromium is then deposited on the nickel foil by the technique described in Example 18.

(c) The so-deposited chromium is then alloyed with the nickel-foil as is described in Example 18.

(d) Aluminum is then vapor deposited on the metal foil so as to produce a substrate which contains about 4 weight percent aluminum. The aluminum is then alloyed with the substrate by heating to about 1900° F. for a period of about 30 minutes at sub-atmospheric pressure (½ atmosphere of argon).

(e) The nickel-cobalt-iron metal foil is then expanded by the technique described in Example 18.

(f) The so-produced expanded metal foil is then coated with a $NO_x$ reducing catalyst consisting essentially of 100 percent nickel by the technique described in Example 18.

EXAMPLE 21

A supported catalyst capable of catalytically reducing the $NO_x$ gases found in the exhaust stream of the internal combustion engine is produced as follows:

(a) A sheet of nickel foil about 15 feet in length by about 4 inches wide by about 0.002 inches thick is obtained.

(b) This sheet of nickel foil is then electroplated with chromium until a weight increase of about 20 percent is achieved.

(c) The chromium is then alloyed with the nickel foil by heating the so-coated metal foil structure at a temperature of about 2200° F. for a period of about 2 hours under sub-atmospheric conditions (at a pressure of about ½ at atmosphere of argon). The composition of the resultant metal foil substrate is about 80 weight percent nickel and about 20 weight percent chromium.

(d) Nickel and copper are electrolytically co-deposited on the surface of the foil substrate so as to produce a catalytic coating consisting of about 80 weight percent nickel and about 20 weight percent copper. The so-obtained catalytic coating is approximately 0.0002 inches thick.

(e) This sheet of catalyst coated nickel foil is then expanded by use of a conventional expanding apparatus so that the resultant expanded metal structure has a strand width of about 0.015 inches and contains about 5 diamond-shaped openings per inch of width.

EXAMPLE 22

A supported catalyst capable of catalytically reducing the $NO_x$ gases found in the exhaust stream of the internal combustion engine is produced as follows:

(a) A sheet of wrought metal foil composed of about 33 weight percent nickel and about 67 weight percent cobalt, being about 15 feet long by 4 inches wide by 0.002 inches thick is obtained.

(b) Chromium is then deposited on the nickel foil structure as is described in Example 21.

(c) The so-deposited chromium is then alloyed with the nickel-foil structure as is described in Example 21.

(d) Aluminum is then vapor deposited on the metal foil so as to produce a substrate which contains about 4 weight percent aluminum. The aluminum is then alloyed with the substrate by heating to about 1900° F. for a period of about 30 minutes at sub-atmospheric pressure (½ atmosphere of argon).

(e) A coating about 0.0002 inches thick consisting of about 80 weight percent nickel and about 20 weight percent copper is deposited on the nickel-cobalt foil by electroplating the complete surface of the so-produced nickel base substrate with nickel to provide a coating thereover. Subsequently, a coating of copper is electrolytically overplated on the nickel coated substrate. The copper and nickel are then alloyed together and diffusion bonded to the substrate by heating the so-coated article to a temperature of about 1900° F. for a period of about 2 hours at sub-atmospheric pressures (½ atmosphere of argon).

(f) The sheet of catalyst coated nickel-cobalt foil is expanded as is described in Example 21.

EXAMPLE 23

A supported catalyst capable of catalytically reducing the $NO_x$ gases found in the exhaust stream of the internal combustion engine is produced as follows:

(a) A sheet of wrought metal foil consisting of about 60 weight percent nickel and about 40 weight percent iron, about 15 feet long by about 4 inches wide by about 0.002 inches thick is obtained.

(b) Chromium is then deposited on the wrought nickel-iron foil the technique described in Example 21.

(c) The chromium is alloyed with the nickel-iron foil by the technique described in Example 21.

(d) A $NO_x$ reducing catalyst consisting of about 80 weight percent nickel and about 20 weight percent copper is applied to the metal foil substrate by the technique described in Example 22.

(e) This sheet of catalyst coated wrought nickel-iron foil is then expanded by the technique described in Example 21.

EXAMPLE 24

A supported catalyst capable of catalytically reducing the $NO_x$ gases emanating from the internal combustion engine is produced as follows:

(a) A sheet of wrought corrosion resistant metal foil consisting of about 80 weight percent nickel, about 15 weight percent chromium and 5 weight percent aluminum which is about 15 feet long by 4 inches wide by 0.002 inches thick is obtained.

(b) This sheet of wrought nickel-chromium-aluminum corrosion resistant foil is then expanded by use of a conventional expanding apparatus so that the resultant expanded metal structure has a strand width of about 0.015 inches and contains about 5 diamond-shaped openings per inch of width.

(c) The complete surface of the nickel-chromium-aluminum substrate is then electroplated with nickel to provide a coating having a thickness of about 0.0002 inches. Subsequently, a coating of copper about 0.0002 inches thick is electrolytically overplated on the nickel coated substrate. The copper and nickel are then alloyed together and diffusion bonded to the substrate by heating the so-coated article to a temperature of about 1900° F. for a period of about 2 hours at sub-atmospheric pressures (½ atmosphere of argon).

EXAMPLE 25

A supported catalyst capable of catalytically reducing the $NO_x$ gases emanating from the internal combustion engine is produced as follows:

(a) A sheet of corrosion resistant metal foil consisting of about 80 weight percent nickel and about 20 weight percent chromium, about 15 feet long by about 4 inches wide by about 0.002 inches thick is obtained. This sheet of metal foil is produced by vapor depositing nickel and chromium followed by a suitable homogenizing heat treatment.

(b) This sheet of corrosion resistant metal foil is then expanded as is described in Example 24.

(c) A $NO_x$ reducing catalyst consisting of about 80 weight percent nickel and about 20 weight percent copper is applied to the expanded, corrosion resistant metal foil substrate by the technique described in Example 24.

EXAMPLE 26

A supported catalyst capable of catalytically reducing the $NO_x$ gases found in the exhaust stream of the internal combustion engine is produced as follows:

(a) A sheet of corrosion resistant wrought metal foil consisting of about 80 weight percent nickel, 5 weight percent cobalt and 15 weight percent chromium which is about 15 feet long by about 4 inches wide by about 0.002 inches thick is obtained.

(b) The complete surface of the nickel-chromium substrate is then electroplated with nickel to provide a nickel coating having a thickness of about 0.0002 inches. The nickel catalyst is then diffusion bonded to the metal foil substrate by heating the nickel coated article to a temperature of about 1900° F. for about 2 hours at subatmospheric pressures (about ½ atmosphere of argon).

(c) This sheet of catalyst coated corrosion resistant metal foil is then expanded by use of a conventional expanding apparatus so that the resultant expanded metal structure has a strand width of about 0.015 inches and contains about 5 diamond-shaped openings per inch of width.

EXAMPLE 27

A supported catalyst capable of catalytically reducing the $NO_x$ gases found in the exhaust stream of the internal combustion engine is produced as follows:

(a) A sheet of corrosion resistant metal foil consisting of about 80 weight percent nickel and about 20 weight percent chromium, about 15 feet long by about 4 inches wide by about 0.002 inches thick is obtained. This sheet of corrosion resistant metal foil is produced by electrolytically co-depositiong nickel and chromium.

(b) A coating of a nickel $NO_x$ reducing catalyst about 0.001 inches thick is then electrolytically deposited on the surface of the corrosion resistant foil by the technique described in Example 26.

(c) This sheet of catalyst coated corrosion resistant metal foil is expanded as is described in Example 26.

Further examples of the invention are found in our co-pending applications Ser. Nos. 451,032 filed Mar. 22, 1974; 457,101 filed Apr. 1, 1974; 467,106 filed May 6, 1974; 460,742; 460,786; 460,787 and 461,436 all filed Apr. 15, 1974, and Ser. No. 466,737 filed May 3, 1974, and are incorporated herein by reference.

With regard to catalytic structures of the foregoing type, recent tests have shown that they exhibit remarkably superior performance characteristics with respect to the reduction of $NO_x$ when compared to any known $NO_x$ reducing catalytic structure. Specifically, a $NO_x$ reducing catalytic assembly was produced by fashioning a sheet of catalyst coated foil (of the type described in Example 15) into a helical coil 4 inches in diameter by 4 inches in length and inserting it into a hollow cylindrical housing (as shown in FIG. 6). This catalyst assembly was then tested in a conventional 1970 model year, 350 cubic inch V-8 engine with the result being that the $NO_x$ content of the exhaust gas has been reduced in excess of 90% over the same engine without a $NO_x$ catalyst, i.e., the so-treated exhaust gas contained less than 0.4 grams of $NO_x$ per mile. At this time, the exact mechanism which makes these results possible is not yet completely understood. It may reside in the chemistry of the system, the use of expanded metal foil, the interaction of the materials, or a combination thereof.

Catalysts of the type described herein can be utilized in a system for operating an internal combustion engine (as described relative to FIG. 12) with a high degree of success. Such a system when used in conjunction with a conventional oxidation catalyst provides an ideal method for reducing $NO_x$, carbon monoxide and unburned hydrocarbon content of automotive exhaust gases.

In a dual bed system, after the $NO_x$ reduction treatment, the exhaust gases are then brought into contact with an oxidation catalyst to remove carbon monoxide and gaseous hydrocarbons therefrom. As such oxidation catalysts are well known in the art, they will not be discussed herein in detail.

The catalyst structures of the invention also find useful application in three stage systems of the type described by Fedor et al. in their paper "Durability Experience with Metallic $NO_x$ Catalysts" SAE No. 741,081 which is incorporated herein by reference.

Tests have shown that structures of the type herein set forth have significant advantages over other types of catalytic structures such as screen, saddles, or the like. It is possible, although this has not as yet been established, that such advantages are derived from the fact that an expanded metal provides, in addition to a ratio of low mass to high surface area, a structure in which the gases which pass through the openings are deflected by the sharp edges, thereby increasing the contact between the gas and the metal foil.

As can be seen from a review of the foregoing, the instant invention provides an article for reducing the $NO_x$ content of the exhaust gas stream emanating from the internal combustion engine and a method of using such an article which comprises bringing the exhaust gas stream into contact with a $NO_x$ reducing structure of the type herein described which includes an oxidation resistant substrate having an effective amount of a $NO_x$ reducing catalyst on the surface thereof.

While there have been described herein what at present are considered to be the preferred embodiments of the instant invention, it will be readily appreciated by those skilled in the art that various changes and modifications may be made in the practice of the instant invention without departing from its spirit and scope. Accordingly, the scope of the invention is to be limited solely by the scope of the appended claims.

We claim:

1. In the process of reducing the nitrogen oxide content of the exhaust gases from an internal combustion engine wherein the exhaust gases are contacted with an $NO_x$ reduction catalyst to chemically reduce oxides of nitrogen, the improvement comprising using at the $NO_x$ reduction catalyst a catalytic structure having high $NO_x$ reducing activity and structural durability in the presence of said exhaust gases at temperatures up to 1900° F. consisting essentially of an expanded metal foil reinforcing member having a plurality of strands defining openings therebetween which retains its strength and oxidation resistance at temperatures in excess of about 1100° F. and up to about 1900° F. and a metallic catalytic surface layer comprising an $NO_x$ reducing catalyst material metallurgically bonded to said reinforcing member.

2. The process of claim 1 wherein said expanded metal foil has a thickness less than about 0.010 inches.

3. The process of claim 1 wherein said expanded metal foil reinforcing member is a chromium containing alloy.

4. The process of claim 3 wherein said chromium is present as a gradient of chromium between said reinforcing member and the surface of said catalytic structure with the concentration of chromium varying from a maximum concentration in the reinforcing member to a minimum concentration up to about 15% by weight in said catalytic layer.

5. The process of claim 3 wherein said expanded metal foil reinforcing member is an alloy of nickel and chromium.

6. The process of claim 5 wherein said chromium is present as a gradient of chromium between said reinforcing member and the surface of said catalytic structure with the concentration of chromium varying from a maximum concentration in the reinforcing member to a minimum concentration up to about 15% by weight in said catalytic layer.

7. The process of claim 6 wherein said expanded metal foil reinforcing member is an alloy of from 50 to 82 weight percent nickel and 18 to 50 weight percent chromium.

8. The process of claim 5 wherein said metallic reinforcing member consists essentially of about 80 weight percent commercially pure nickel and about 20 weight percent chromium.

9. The process of claim 1 wherein said metallic catalytic surface layer comprises metal selected from the group consisting of nickel, cobalt, iron, manganese, copper and mixtures thereof.

10. The process of claim 1 wherein said metallic catalytic surface layer constitutes about 0.5 to 50 weight percent of said catalytic structure.

11. The process of claim 1 wherein said $NO_x$ reducing catalyst material is an alloy of nickel and copper.

12. The process of claim 1 wherein said $NO_x$ reducing catalyst material is nickel.

13. The process of claim 1 wherein said $NO_x$ reducing catalyst material is copper.

14. In the process of reducing the concentration of undesirable gases in the exhaust gases of an internal combustion engine wherein said exhaust gases are contacted with a metallic $NO_x$ reduction catalyst to chemically reduce oxides of nitrogen, the improvement comprising utilizing as the $NO_x$ reduction catalyst a catalytic structure having high $NO_x$ reducing activity and structural durability consisting essentially of a metallic reinforcing member which retains its strength and oxidation resistance at temperatures in excess of about 1100° F. and up to about 1900° F. and a metallic catalytic surface layer comprising an $NO_x$ catalyst comprising an alloy of nickel and copper, said metallic reinforcing member being an expanded metal foil comprising:
(i) from about 50 to 85% of a first metal selected from the group consisting of nickel, mixtures of nickel and cobalt, mixtures of nickel and iron, and mixtures of nickel, iron and cobalt, said iron and cobalt individually not exceeding about 1 weight percent of said member and said nickel being present in an amount of at least about 48 weight percent of said member,
(ii) from about 15 to about 50 weight percent of a second metal selected from the group consisting of chromium and mixtures of chromium and aluminum said aluminum not exceeding about 10 weight percent of said member and said chromium being present in an amount of at least about 5 percent of said member.

15. The process of claim 14 wherein said first metal is nickel and is present in an amount of from 50 to 82 weight percent and said second metal is chromium and is present in an amount of from 18 to 50 weight percent of said metallic member.

16. The process of claim 14 wherein said metallic reinforcing member consists essentially of about 80 weight percent commercially pure nickel and about 20 weight percent chromium.

17. The process of claim 14 wherein said metallic reinforcing member is an expanded metal foil having a thickness less than about 0.010 inches.

18. The process of claim 15 wherein said metallic reinforcing member is an expanded metal foil having a thickness less than about 0.010 inches.

19. The process of claim 16 wherein said metallic reinforcing member is an expanded metal foil having a thickness less than about 0.010 inches.

20. The process of claim 14 wherein said $NO_x$ catalyst constitutes about 0.5 to 50 weight percent of said catalytic structure.

21. The process of claim 18 wherein said $NO_x$ catalyst consists essentially of 80 weight percent nickel and 20 weight percent copper.

22. The process of claim 19 wherein said $NO_x$ catalyst consists essentially of 80 weight percent nickel and 20 weight percent copper.

23. The process of claim 14 wherein said chromium is present throughout the catalytic structure as a gradient of chromium ranging from a maximum concentration in said reinforcing member to a minimum concentration up to about 15% by weight in said catalytic layer.

24. The process of claim 15 wherein said chromium is present throughout the catalytic structure as a gradient of chromium ranging from a maximum concentration in said reinforcing member to a minimum concentration up to about 15% by weight in said catalytic layer.

25. The process of claim 18 wherein said chromium is present throughout the catalytic structure as a gradient of chromium ranging from a maximum concentration in said reinforcing member to a minimum concentration up to about 15% by weight in said catalytic layer.

26. The process of claim 20 wherein said chromium is present throughout the catalytic structure as a gradient of chromium ranging from a maximum concentration in said reinforcing member to a minimum concentration up to about 15% by weight in said catalytic layer.

27. The process of claim 21 wherein said chromium is present throughout the catalytic structure as a gradient of chromium ranging from a maximum concentration in said reinforcing member to a minimum concentration up to about 15% by weight in said catalytic layer.

28. The process of claim 22 wherein said chromium is present throughout the catalytic structure as a gradient of chromium ranging from a maximum concentration in said reinforcing member to a minimum concentration up to about 15% by weight in said catalytic layer.

* * * * *